United States Patent
Kim et al.

(10) Patent No.: US 12,538,265 B2
(45) Date of Patent: Jan. 27, 2026

(54) ELECTRONIC DEVICE FOR RECEIVING PAGING MESSAGE AND OPERATION METHOD THEREOF

(71) Applicant: SAMSUNG ELECTRONICS CO., LTD., Suwon-si (KR)

(72) Inventors: Songkyu Kim, Suwon-si (KR); Sanghyun Lee, Suwon-si (KR); Minseok Shin, Suwon-si (KR); Inhye Yeom, Suwon-si (KR); Jungmin Oh, Suwon-si (KR); Kyungwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 372 days.

(21) Appl. No.: 18/107,202

(22) Filed: Feb. 8, 2023

(65) Prior Publication Data

US 2023/0189206 A1    Jun. 15, 2023

Related U.S. Application Data

(63) Continuation of application No. PCT/KR2021/010717, filed on Aug. 12, 2021.

(30) Foreign Application Priority Data

Aug. 12, 2020 (KR) .................. 10-2020-0100952

(51) Int. Cl.
*H04W 68/04* (2009.01)
*H04W 56/00* (2009.01)
(Continued)

(52) U.S. Cl.
CPC ....... *H04W 68/005* (2013.01); *H04W 56/001* (2013.01); *H04W 68/02* (2013.01);
(Continued)

(58) Field of Classification Search
CPC . H04W 68/005; H04W 68/02; H04W 56/001; H04W 76/28; H04W 24/10;
(Continued)

(56) References Cited

U.S. PATENT DOCUMENTS

| | | |
|---|---|---|
| 2016/0119895 A1 | 4/2016 | Agiwal et al. |
| 2019/0045559 A1 | 2/2019 | Huang et al. |

(Continued)

FOREIGN PATENT DOCUMENTS

| | | |
|---|---|---|
| CN | 110896563 | 3/2020 |
| CN | 111328458 | 6/2020 |

(Continued)

OTHER PUBLICATIONS

Chinese Office Action issued Jan. 20, 2025 in corresponding Chinese Patent Application No. 202180055557.3.

(Continued)

*Primary Examiner* — Siu M Lee
(74) *Attorney, Agent, or Firm* — NIXON & VANDERHYE P.C.

(57) ABSTRACT

According to an embodiment, an electronic device may comprise: a memory, at least one communication circuit, and at least one processor, wherein the at least one processor is configured to: receive, via the at least one communication circuit, multiple synchronization signal (SS)/physical broadcast channel (PBCH) blocks (SSBs) from a network; identify multiple time slots corresponding to the multiple SSBs, respectively; in a discontinuous reception (DRX) mode, based on a measurement result of a signal measured in at least one of the multiple time slots in a previous period, select at least one time slot in which monitoring is to be performed in a current period; and wake up in the selected at least one time slot to monitor a physical downlink control channel (PDCCH).

21 Claims, 19 Drawing Sheets

(51) Int. Cl.
  *H04W 68/00* (2009.01)
  *H04W 68/02* (2009.01)
  *H04W 72/23* (2023.01)
  *H04W 76/28* (2018.01)
  *H04W 24/10* (2009.01)

(52) U.S. Cl.
  CPC ........... *H04W 72/23* (2023.01); *H04W 76/28* (2018.02); *H04W 24/10* (2013.01)

(58) Field of Classification Search
  CPC ......... H04W 52/0216; H04W 52/0245; H04W 52/0254; H04W 16/28; H04W 72/02; H04W 72/0446; H04W 72/046; H04W 72/23; H04W 72/542; H04B 7/0408; H04B 7/0695; Y02D 30/70
  See application file for complete search history.

(56) References Cited

U.S. PATENT DOCUMENTS

| | | | |
|---|---|---|---|
| 2019/0150114 A1 | 5/2019 | Liu et al. | |
| 2019/0239192 A1 | 8/2019 | Tang | |
| 2020/0022068 A1 | 1/2020 | Ly et al. | |
| 2020/0236647 A1 | 7/2020 | Agiwal et al. | |
| 2022/0201736 A1* | 6/2022 | Park | H04W 72/23 |
| 2022/0377756 A1* | 11/2022 | Sun | H04W 72/21 |
| 2023/0146553 A1* | 5/2023 | Liao | H04W 68/02 370/329 |
| 2024/0364478 A1* | 10/2024 | Wang | H04W 76/28 |

FOREIGN PATENT DOCUMENTS

| | | |
|---|---|---|
| KR | 10-2018-0045607 | 5/2018 |
| KR | 10-1887116 | 8/2018 |
| KR | 10-2020-0050309 | 5/2020 |
| WO | 2018/144873 | 8/2018 |
| WO | 2019/053340 | 3/2019 |
| WO | 2019/099661 | 5/2019 |
| WO | 2019/242027 | 12/2019 |
| WO | 2019/246425 | 12/2019 |
| WO | 2020/032867 | 2/2020 |
| WO | 2020/033648 | 2/2020 |
| WO | 2020/143002 | 7/2020 |

OTHER PUBLICATIONS

International Search Report mailed Nov. 12, 2021 in PCT application PCT/KR2021/010717, 2 pages.
Written Opinion mailed Nov. 12, 2021 in PCT application PCT/KR2021/010717, 3 pages.
Sony, "Considerations on Multi-beams Operation & Paging Resource Allocations", R2-1803141, 3GPP TSG RAN WG2 Meeting #101, Athens, Greece, Feb. 26-Mar. 2, 2018, 7 pages.
Vivo, "UE power Consumption Reduction in RRM Measurements", R1-1813862, 3GPP TSG RAN WG1 Meeting #95, Spokane, US, Nov. 12-16, 2018, 10 pages.
Ericsson, "On initial access, RRM, mobility and RLM", R1-18813459, 3GPP TSG RAN WG1 Meeting #95, Spokane, US, Nov. 12-16, 2018, 16 pages.
3GPP TSG-RAN, "Finalization of NR Paging", Meeting Notes, Meeting #91, Nov. 27-Dec. 1, 2017, 7 pages.
Extended European Search Report dated Jan. 23, 2024 issued in European Patent Application No. 21856255.1.
Decision to Grant for CN Application No. 2021800555573 issued Jun. 10, 2025 and English translation, 7 pages.
Office Action for KR Application No. 10-2020-0100952 dated Nov. 25, 2025 and English translation, 11 pages.

* cited by examiner

ELECTRONIC DEVICE FOR RECEIVING PAGING MESSAGE AND OPERATION METHOD THEREOF

CROSS-REFERENCE TO RELATED APPLICATIONS

This application is a continuation of International Application No. PCT/KR2021/010717 designating the United States, filed on Aug. 12, 2021, in the Korean Intellectual Property Receiving Office and claiming priority to Korean Patent Application No. 10-2020-0100952, filed on Aug. 12, 2020, in the Korean Intellectual Property Office, the disclosures of which are incorporated by reference herein in their entireties.

BACKGROUND

Field

The disclosure relates to an electronic device for receiving a paging message and an operation method thereof.

Description of Related Art

Efforts are being made to develop an improved 5th generation (5G) communication system or a pre-5G communication system to meet the increasing demand for wireless data traffic after commercialization of the 4th generation (4G) communication system. For this reason, the 5G communication system or the pre-5G communication system is called a beyond-4G-network communication system or a post-long-term evolution (post-LTE) system.

In order to achieve a high data transfer rate, implementation of the 5G communication system in a very high frequency (mmWave) band (such as, for example, a 60 GHz band) is being considered. In order to mitigate the path loss of radio waves and increase the propagation distance of radio waves in the very high frequency band, in the 5G communication system, beamforming, massive MIMO, and full dimensional MIMO (FD-MIMO), array antenna, analog beam-forming, and large-scale antenna technologies are being discussed.

An electronic device supporting 5G may use discontinuous reception (DRX) in an RRC_INACTIVE state or an RRC_IDLE state to reduce battery consumption. The electronic device may monitor one paging occasion (PO) for each DRX cycle (or paging cycle). The electronic device may wake up during at least a part of the PO to monitor a physical downlink control channel (PDCCH), and may maintain a sleep state (or an inactive state) during the remaining occasion, thereby reducing battery consumption and/or resource consumption.

In a multi-beam environment, a network needs to transmit a paging message for each of a plurality of beam indexes. For example, when an electronic device is in a DRX mode, the network may not identify which beam index the electronic device has selected. The network may transmit a paging message for each beam index in each of a plurality of time slots in one PO.

There is no suggestion as to which paging message the electronic device has to select when a paging message is transmitted in each of the plurality of time slots. The 3rd generation partnership project (3GPP) technical specification (TS) 38.304 specifies that, in a multi-beam environment, a user equipment assumes that an identical paging message and an identical short message are repeated in all transmitted beams, and the selection of beam(s) for receiving the paging message and the short message depends on implementation of the user equipment.

SUMMARY

An embodiment of the disclosure may determine a time slot in which monitoring is to be performed in a current period, based on the strength of a signal measured in a previous period.

According to an example embodiment, an electronic device may include: a memory; at least one communication circuit; and at least one processor, wherein the at least one processor is configured to: receive, via the at least one communication circuit, a plurality of synchronization signal (SS)/physical broadcast channel (PBCH) blocks (SSBs) from a network, identify a plurality of time slots corresponding to the plurality of SSBs, respectively, select, based on a measurement result of a signal measured in at least one of the plurality of time slots in a previous period in a discontinuous reception (DRX) mode, at least one time slot in which monitoring is to be performed in a current period, and wake up in the selected at least one time slot and monitor a physical downlink control channel (PDCCH).

According to an example embodiment, an electronic device may include a memory; at least one communication circuit; and at least one processor, wherein the at least one processor is configured to: receive, via the at least one communication circuit, a plurality of synchronization signal (SS)/physical broadcast channel (PBCH) blocks (SSBs) from a network, identify a plurality of time slots corresponding to the plurality of SSBs, respectively, select at least one time slot, in which monitoring is to be performed in a current period, based on information associated with movement of the electronic device in a discontinuous reception (DRX) mode, and wake up in the selected at least one PDCCH monitoring occasion and monitor a physical downlink control channel (PDCCH).

According to an example embodiment, a method of operating an electronic device may include: receiving a plurality of synchronization signal (SS)/physical broadcast channel (PBCH) blocks (SSBs) from a network, identifying a plurality of time slots corresponding to the plurality of SSBs, respectively, selecting, based on a measurement result of a signal measured in at least one of the plurality of time slots in a previous period, in a discontinuous reception (DRX) mode, at least one time slot, in which monitoring is to be performed in a current period, and waking up in the selected at least one time slot and monitoring a physical downlink control channel (PDCCH).

According to an example embodiment, a method of operating an electronic device may include: receiving a plurality of synchronization signal (SS)/physical broadcast channel (PBCH) blocks (SSBs) from a network, identifying a plurality of time slots corresponding to the plurality of SSBs, respectively, selecting, based on information associated with movement of the electronic device in a discontinuous reception (DRX) mode, at least one time slot in which monitoring is to be performed in a current period, and waking up in the selected at least one physical downlink control channel (PDCCH) monitoring occasion and monitoring a PDCCH.

An example embodiment may provide an electronic device capable of determining a time slot in which monitoring is to be performed in a current period based on the strength of a signal measured in a previous period, and an operation method thereof. Accordingly, the electronic device may not wake up to perform monitoring in all time slots, thereby saving power and/or resources.

BRIEF DESCRIPTION OF THE DRAWINGS

The above and other aspects, features and advantages of an embodiment of the present disclosure will be more apparent from the following detailed description, taken in conjunction with the accompanying drawings, in which.

DETAILED DESCRIPTION

Figure 1:
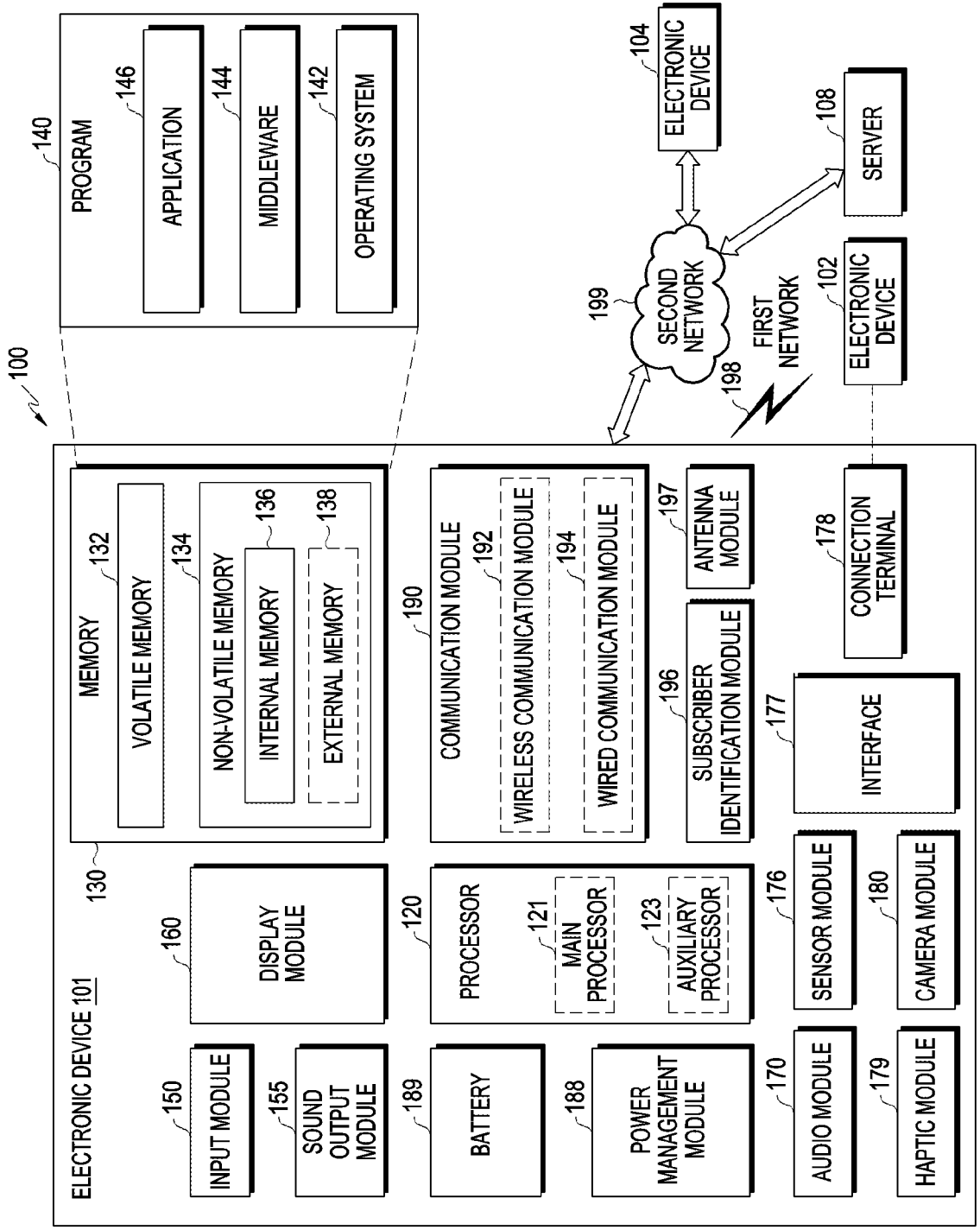
FIG. 1 is a block diagram illustrating an example electronic device in a network environment, according to an embodiment.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
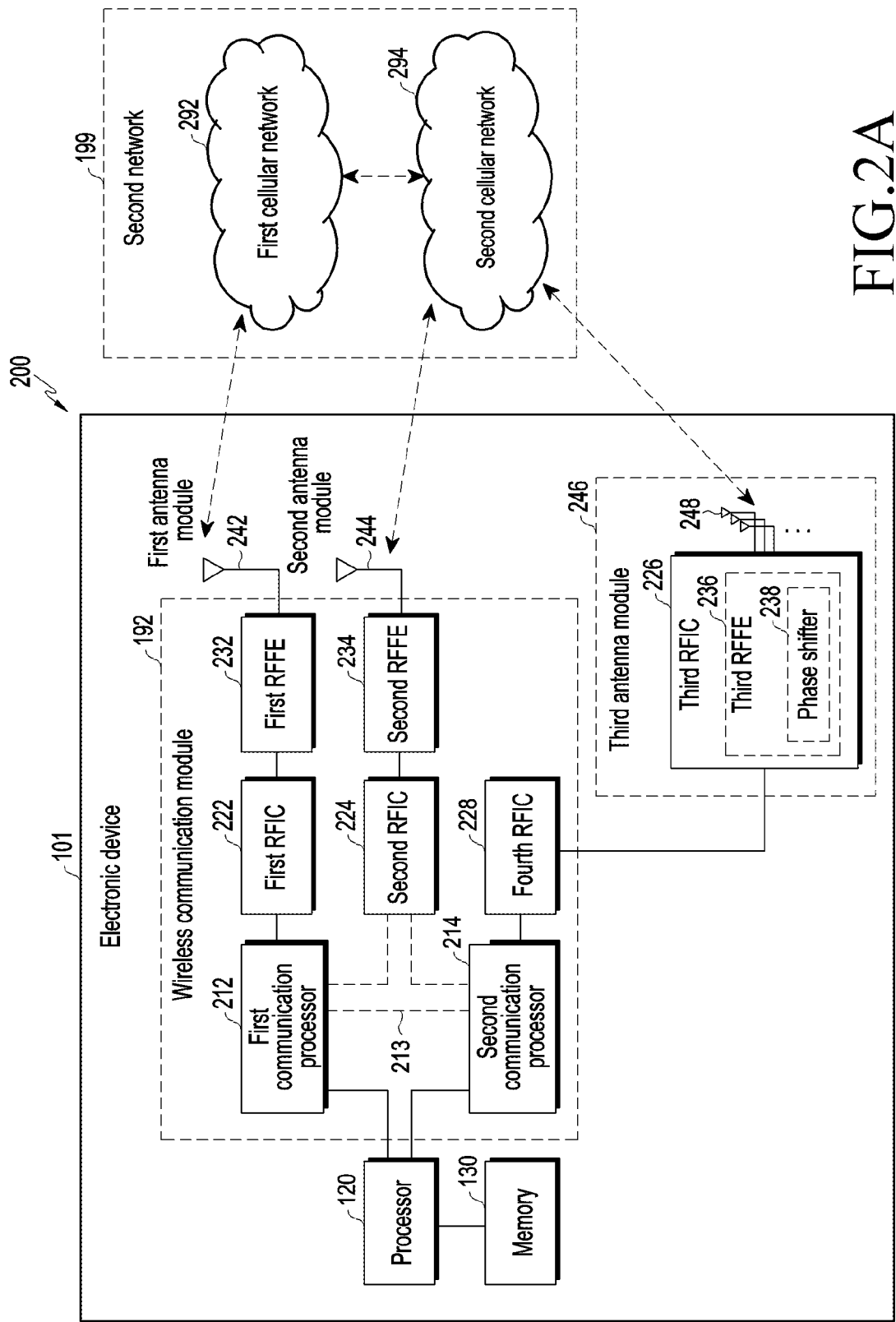
FIG. 2A is a block diagram illustrating an example configuration of an electronic device for supporting network communication and 5G network communication according to an embodiment.

FIG. 2A is a block diagram 200 illustrating an example configuration of an electronic device 101 for supporting network communication and 5G network communication according to an embodiment. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, a third antenna module (e.g., including at least one antenna) 246, and antennas 248. The electronic device 101 may further include a processor (e.g., including processing circuitry) 120 and a memory 130. A second network 199 may include a first network 292 and a second network 294. According to an embodiment, the electronic device 101 may further include at least one among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to an embodiment, the fourth RFIC 228 may be omitted or may be included as a part of the third RFIC 226.

The first communication processor 212 may include various processing circuitry and establish a communication channel for a band to be used for wireless communication with the first network 292, and may support legacy network communication through the established communication channel. According to an embodiment, the first network may be a legacy network including a 2G, 3G, 4G, or long-term-evolution (LTE) network. The second communication processor 214 may include various processing circuitry and establish a communication channel corresponding to a designated band (e.g., from about 6 GHz to about 60 GHz) among bands to be used for wireless communication with the second network 294, and may support 5G network communication through the established communication channel. According to an embodiment, the second network 294 may be a 5G network defined in the 3GPP. Additionally, according to an embodiment, the first communication processor 212 or the second communication processor 214 may establish a communication channel corresponding to another designated band (e.g., about 6 GHz or less) among bands to be used for wireless communication with the second network 294, and may support 5G network communication through the established communication channel.

The first communication processor 212 may transmit and receive data to and from the second communication processor 214. For example, data that has been classified as being transmitted over the second cellular network 294 may be transmitted over the first cellular network 292. In this case, the first communication processor 212 may receive transmission data from the second communication processor 214.

For example, the first communication processor 212 may transmit and receive data to and from the second communication processor 214 through an inter-processor interface 213. The inter-processor interface 213 may be implemented as, for example, a universal asynchronous receiver/transmitter (UART) (e.g., a high speed-UART (HS-UART) or peripheral component interconnect bus express (PCIe) interface, but the type thereof is not limited. Alternatively, the first communication processor 212 and the second communication processor 214 may exchange control information and packet data information using, for example, a shared memory. The first communication processor 212 may transmit and receive various types of information, such as sensing information, information on output strength, and resource block (RB) allocation information, to and from the second communication processor 214.

Depending on the implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., the application processor) through the HS-UART interface or the PCIe interface, but the type of interface e is not limited. Alternatively, the first communication processor 212 and the second communication processor 214 may exchange control information and packet data information with the processor 120 (e.g., the application processor) using a shared memory.

Figure 2B:
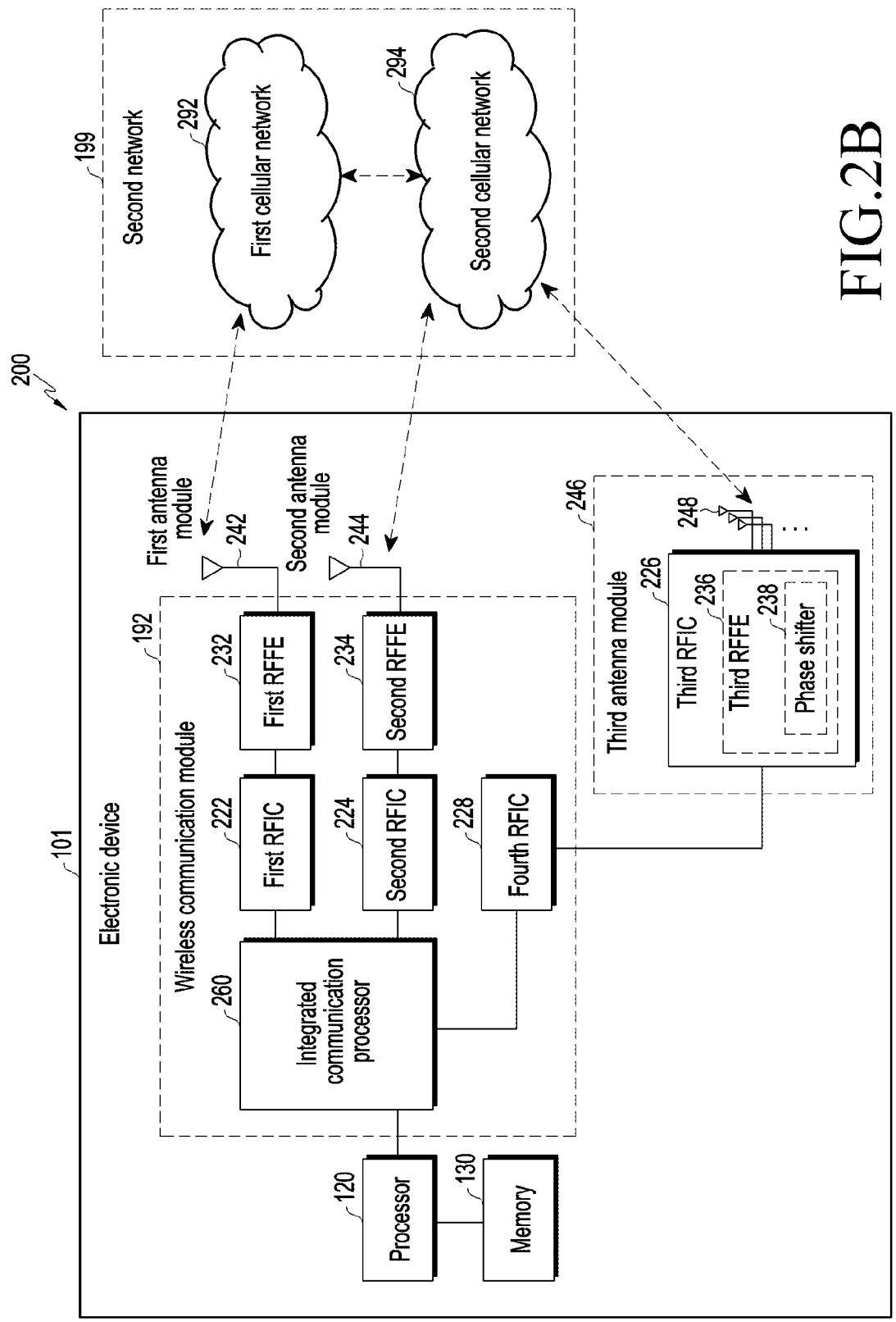
FIG. 2B is a block diagram illustrating an example configuration of an electronic device for supporting network communication and 5G network communication according to an embodiment.

According to an embodiment, the first communication processor 212 and the second communication processor 214 may be implemented in a single chip or a single package. According to an embodiment, the first communication processor 212 or the second communication processor 214 may be disposed in a single chip or a single package together with the processor 120, the auxiliary processor 123, or the communication module 190. For example, as illustrated in FIG. 2B, an integrated communication processor 260 may support a function for communication with both the first cellular network 292 and the second cellular network 294.

At the time of transmission, the first RFIC 222 may convert a baseband signal generated by the first communication processor 212 into a radio-frequency (RF) signal of about 700 MHz to about 3 GHz used for the first network 292 (e.g., a legacy network). At the time of reception, an RF signal may be acquired from the first network 292 (e.g., the legacy network) through an antenna (e.g., the first antenna module 242), and may be preprocessed through an RFFE (e.g., the first RFFE 232). The first RFIC 222 may convert the preprocessed RF signal into a baseband signal that can be processed by the first communication processor 212.

At the time of transmission, the second RFIC 224 may convert a baseband signal generated by the first communication processor 212 or the second communication processor 214 into an RF signal of a Sub6 band (e.g., about 6 GHz or less) used for the second network 294 (e.g., a 5G network) (hereinafter, referred to as a 5G Sub6 RF signal). At the time of reception, a 5G Sub6 RF signal may be acquired from the second network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal that can be processed by a corresponding communication processor of the first communication processor 212 or the second communication processor 214.

The third RFIC 226 may convert a baseband signal generated by the second communication processor 214 into an RF signal of a 5G Above6 band (e.g., from about 6 GHz to about 60 GHz) to be used in the second network 294 (e.g., the 5G network) (hereinafter, referred to as a 5G Above6 RF signal). At the time of reception, a 5G Above6 RF signal may be acquired from the second network 294 (e.g., the 5G network) through an antenna (e.g., the antennas 248), and may be preprocessed through the third RFFE 236. The third RFIC 226 may convert the preprocessed 5G Above6 RF signal into a baseband signal that can be processed by the second communication processor 214. According to an embodiment, the third RFFE 236 may be formed as a part of the third RFIC 226.

According to an embodiment, the electronic device 101 may include the fourth RFIC 228 separately from the third RFIC 226 or as at least a part thereof. The fourth RFIC 228 may convert a baseband signal generated by the second communication processor 214 into an RF signal of an intermediate frequency band (e.g., from about 9 GHz to about 11 GHz) (hereinafter, referred to as an IF signal), and may then transmit the IF signal to the third RFIC 226. The third RFIC 226 may convert the IF signal into a 5G Above6 RF signal. At the time of reception, a 5G Above6 RF signal may be received from the second network 294 (e.g., the 5G network) through an antenna (e.g., the antennas 248), and may be converted into an IF signal by the third RFIC 226. The fourth RFIC 228 may convert the IF signal into a baseband signal that can be processed by the second communication processor 214.

According to an embodiment, the first RFIC 222 and the second RFIC 224 may be implemented as at least a part of a single package or a single chip. According to an embodiment, in FIG. 2A or 2B, when the first RFIC 222 and the second RFIC 224 are implemented as a single chip or a single package, the first RFIC 222 and the second RFIC 224 may be implemented as an integrated RFIC. In this case, the integrated RFIC may be connected to the first RFFE 232 and the second RFFE 234, and the integrated RFIC may convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a part of a single package or a single chip. According to an embodiment, at least one antenna module of the first antenna module 242 or the second antenna module 244 may be omitted, or may be combined with the other antenna module to process RF signals of multiple bands corresponding thereto.

According to an embodiment, the third RFIC 226 and the antennas 248 may be arranged on the same substrate to form the third antenna module 246. For example, the wireless communication module 192 or the processor 120 may be disposed on a first substrate (e.g., a main PCB). In this case, the third antenna module 246 may be formed by disposing the third RFIC 226 in a partial region (e.g., a lower surface) of a second substrate (e.g., a sub-PCB) different from the first substrate and disposing the antennas 248 in another partial region (e.g., an upper surface) of the second substrate. Disposing the third RFIC 226 and the antennas 248 on the same substrate may reduce the length of a transmission line therebetween. This may reduce, for example, the loss (e.g., attenuation) of a signal in a high-frequency band (e.g., from about 6 GH to about 60 GHz) used for 5G network communication due to the transmission line. Therefore, the electronic device 101 may enhance the quality or speed of communication with the second network 294 (e.g., the 5G network).

According to an embodiment, the antennas 248 may be formed as an antenna array including multiple antenna elements which can be used for beamforming. In this instance, for example, the third RFIC 226 may include, as a part of the third RFFE 236, multiple phase shifters 238 corresponding to the multiple antenna elements. At the time of transmission, each of the multiple phase shifters 238 may shift the phase of a 5G Above6 RF signal to be transmitted from the electronic device 101 to the outside (e.g., a base station of a 5G network) through a corresponding antenna element. At the time of reception, each of the multiple phase shifters 238 may shift the phase of a 5G Above6 RF signal received from the outside through a corresponding antenna element into an identical or substantially identical phase. This enables transmission or reception through beamforming between the electronic device 101 and the outside.

The second network 294 (e.g., the 5G network) may be operated independently of the first network 292 (e.g., the legacy network) (e.g., standalone (SA)) or may be operated while being connected to the first network (e.g., non-standalone (NSA)). For example, the 5G network may include only an access network (e.g., a 5G radio access network (RAN) or next-generation RAN (NG RAN)), and may not include a core network (e.g., a next-generation core (NGC)). In this instance, the electronic device 101 may access the access network of the 5G network and may then access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

In FIGS. 2A and 2B, the processor 120 is illustrated to be separate from the first communication processor 212, the second communication processor 214, or the integrated communication processor 260, but this is merely a non-limiting example. In an embodiment, the electronic device 101 may include an integrated system on chip (SoC) that supports all of a function of the processor 120, a function for first network communication of the first communication processor 212, and a function for second network communication of the second communication processor 214. It will be understood by those skilled in the art that operations of the processor 120, the first communication processor 212, or the second communication processor 214 herein may also be performed by the integrated SoC.

Although not illustrated, an embodiment of the disclosure may also be applied to an electronic device 101 supporting only LTE communication. In this case, the electronic device 101 may be implemented to include the processor 120 and/or the first communication processor 212, the first RFIC 222, the first RFFE 232, and the first antenna module 242, but not to include an element (e.g., at least one of the second RFIC 224, the second RFFE 234, the second antenna module 244, the second communication processor 214, the fourth RFIC 238, and the third antenna module 246) associated with 5G communication.

Figure 3:
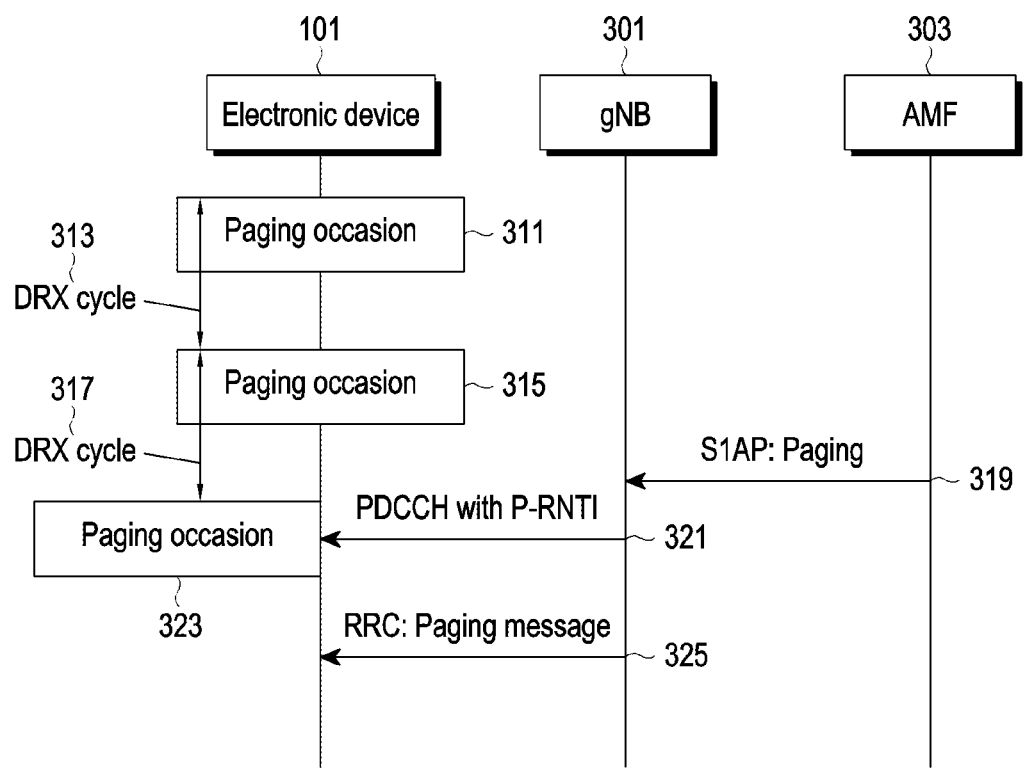
FIG. 3 is a signal flow diagram illustrating an example process of paging in a wireless communication system according to an embodiment.

FIG. 3 is a signal flow diagram illustrating an example process of paging in a wireless communication system according to an embodiment.

A paging procedure may be used to, when an incoming call to an electronic device 101 in an IDLE state or an INACTIVE state occurs, notify of this and start a network connection to the electronic device 101 or notify the electronic devices 101 in a CONNECTED state that system information has been changed. The paging procedure may be controlled by a mobility management entity (AMF) 303 and the paging message may be transmitted via a plurality of cells in a tracking area (TA). The paging message may be transmitted from the AMF 303 to the electronic device 101 through a base station (e.g., a gNB 301). For an efficient paging procedure, a discontinuous reception (DRX) mode may be supported. In the DRX mode, the electronic device 101 may be in a sleep state without performing a reception operation for most of the time. The electronic device 101 should be able to wake up only in a predetermined (e.g., specified) time interval in order to observe paging information from the network. To this end, in NR, a paging occasion (PO) and a paging frame (PF) were defined. A paging occasion may be defined as a subframe or a time point in which there is information for receiving a paging message. A paging frame may be defined as one radio frame including one or multiple paging occasions. According to the embodiment in FIG. 3, the electronic device 101 may observe one paging occasion (PO) per DRX cycle 313 and 317.

According to an embodiment, the electronic device 101 may monitor a physical downlink control channel (PDCCH) in configured paging occasions 311, 315, and 323. The monitoring of the PDCCH may imply an operation of determining whether there is downlink control information (DCI) by performing decoding using a paging-radio network temporary identifier (P-RNTI) in the PDCCH, but is not limited thereto. For example, DCI scheduling a physical downlink shared channel (PDSCH) for a paging message may be scrambled with a P-RNTI. The electronic device 101 may detect DCI as a result of decoding based on the P-RNTI, and may acquire, based on the DCI, time domain resource allocation information for the PDSCH. The electronic device 101 may identify a resource to which the paging message will be transmitted, and may receive the paging message from the identified resource of the PDSCH.

The intervals between the paging occasions 311,315, and 323 may be DRX cycles 313 and 317. The electronic device 101 may fail to detect the DCI indicating the paging message based on the result of monitoring the PDCCH on the paging occasions 313 and 315, and may enter the sleep state again. The sleep state is not limited, and is any state in which less power and/or fewer resources are consumed than a normal state (or an active state). In an example, in the sleep state, at least one of an RFIC, an RFFE, or an antenna module may be turned off. In an example, in the sleep state, blocks, which are required to be always turned on, among communication processors (e.g., modems) may be in a clock gating state, and the remaining blocks may be in an off state. The sleep state may be referred to as an inactive state or an abnormal state.

According to an embodiment, in operation 319, the AMF 303 may transfer a paging message to the gNB 301 by S1 application protocol (SIAP) signaling. In operation 321, the gNB 301 may transmit the DCI scrambled with the P-RNTI on the PDCCH. On the paging occasion 323, the electronic device 101 may monitor the PDCCH based on the P-RNTI and detect the DCI. In operation 325, the electronic device 101 may receive the paging message through radio resource control (RRC) signaling in the PDSCH identified based on the DCI. The paging message may include identifier (UE ID) information of a user equipment that the gNB 301 wants to wake up.

Figure 4A:
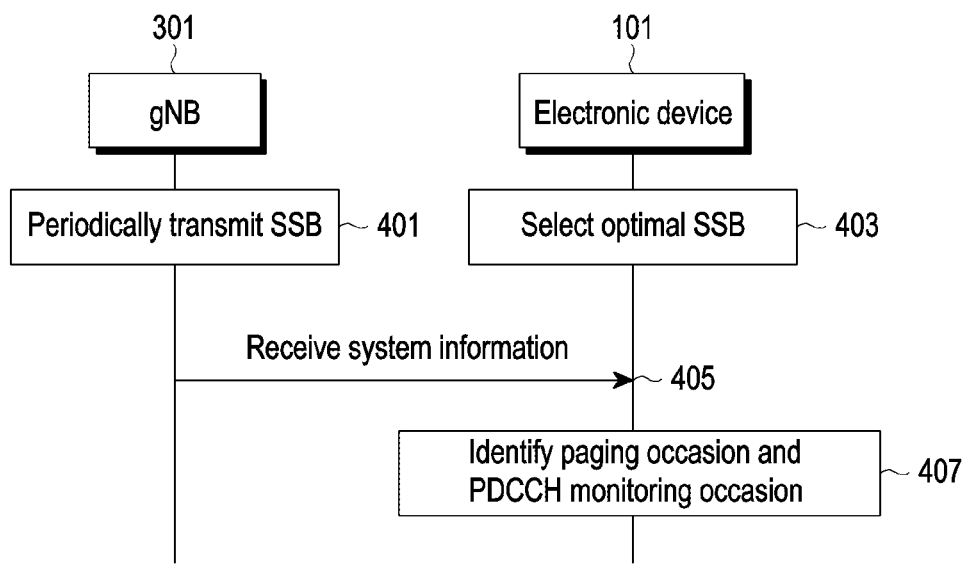
FIG. 4A is a signal flow diagram illustrating example operation methods of an electronic device and a gNB according to an embodiment.
Figure 4B:
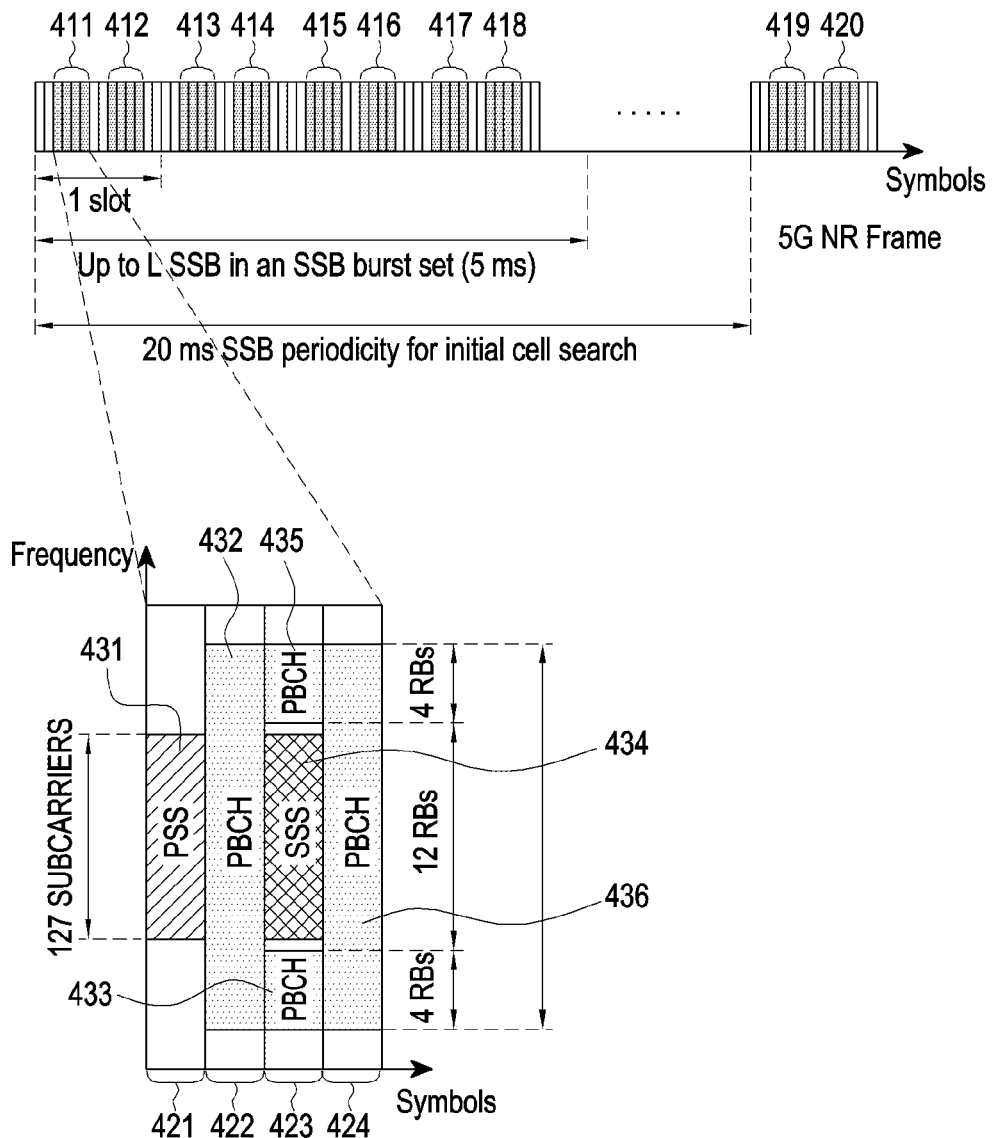
FIG. 4B is a diagram illustrating a synchronization signal block (SSB) in a multi-beam environment according to an embodiment.

FIG. 4A is a signal flow diagram illustrating an example method of operating an electronic device and a gNB according to an embodiment. The embodiment in FIG. 4A will be described in greater detail with reference to FIG. 4B. FIG. 4B is a diagram illustrating a synchronization signal block (SSB) in a multi-beam environment according to an embodiment.

According to an embodiment, in operation 401, a gNB 301 may periodically transmit SSBs. For example, as illustrated in FIG. 4B, the gNB 301 may transmit SSBs 411, 412, 413, 414, 415, 416, 417, 418, 419, and 420. For example, in the example in FIG. 4B, the gNB 301 is illustrated as transmitting two SSBs in one slot, that is, 14 symbols, but those skilled in the art will understand that there is no limit to the number of SSBs in one slot. The gNB 301 may transmit L SSBs, and the L SSBs may be referred to as an SSB burst set. The length of the SSB burst set may be 5 ms, and the transmission period of the SSB burst set may be 20 ms, but is not limited. The gNB 301 may form the L SSBs of the SSB burst set as different beams, respectively, and this may be expressed as performing beam-sweeping by the gNB 301. The gNB 301 may form the SSBs of the SSB burst set in different directions, based on digital beamforming and/or analog beamforming.

Through the beam-sweeping of the gNB 301, the transmission coverage of an SSB may be increased. A first symbol 421 of the SSB 411 may include a primary synchronization signal (PSS) 431, a second symbol 422 may include a first part 432 of a physical broadcast channel (PBCH), a third symbol 423 may include a second part 433 of the PBCH, a secondary synchronization signal (SSS) 434, and a third part 435 of the PBCH, and a fourth symbol 424 may include a fourth part 436 of the PBCH.

According to an embodiment, in operation 403, the electronic device 101 (e.g., at least one among the processor 120, the first communication processor 212, the second communication processor 214, the integrated communication processor 260, or the integrated SoC) may select an optimal SSB. The electronic device 101 may measure the reception strength of each of the SSBs 411, 412, 413, 414, 415, 416, 417, 418, 419, and 420 formed by the gNB 301. Since the SSBs 411, 412, 413, 414, 415, 416, 417, 418, 419, and 420 are formed as different beams, strengths measured by the electronic device 101 may be different. The electronic device 101 may select, for example, an SSB having the maximum reception strength among the SSBs. The electronic device 101 may identify, for example, an SSB index measured as a maximum reception strength, and the SSB index may be used interchangeably with a beam index. In operation 405, the electronic device 101 may receive system information from the gNB 301. In operation 407, the electronic device 101 may identify a paging occasion and a PDCCH monitoring occasion, based on system information identified from the SSB and/or the received system information. Although not illustrated, the electronic device 101 may report information about the selected beam index to the gNB 301.

Hereinafter, a detailed operation in which the electronic device 101 identifies a paging occasion and a PDCCH monitoring occasion will be described in greater detail.

According to an embodiment, the electronic device 101 may assume that an identical paging message or an identical short message is repeated in all transmission beams during a multi-beam operation. In this case, a beam, which is selected to receive the paging message or the short message, may be determined by the implementation of the electronic device. With respect to RAN radio access network (RAN)-initiated paging and core network (CN)-initiated paging, paging messages may be all identical. If the electronic device 101 receives RAN-initiated paging, the electronic device 101 may start an RRC connection resume procedure. If the electronic device 101 receives the CN-initiated paging in an RRC_INACTIVE state, the electronic device 101 may switch to an RRC_IDLE mode, and may notify a network attached storage (NAS) of the switching to the RRC_IDLE mode.

A paging frame (PF) for paging and a paging occasion (PO) may be determined by the following equations. A system frame number (SFN) corresponding to a paging frame may be determined by Equation 1 below. In Equation 1 below, A mod B may imply the modulo operation that outputs the remainder of dividing A by B.

$$(SFN+PF\_offset) \bmod T = (T \text{ div } N)*(UE\_ID \bmod N) \quad [\text{Equation 1}]$$

$$i\_s = \text{floor}(UE\_ID/N) \bmod Ns \quad [\text{Equation 2}]$$

Parameters of [Equation 1] and [Equation 2] for determining the above-described paging frame and paging occasion may be as follows.

- T: DRX cycle configured in the electronic device 101 (DRX cycle may be configured by higher layer signaling (e.g., RRC signaling, system information block (SIB), etc.)
- N: The total number of paging frames in T
- Ns: The number of paging occasions for one paging frame
- PF_offset: Offset value for determining the time point of a paging frame
- UE ID for determining a paging frame and a paging occasion, which may be determined as in [Equation 3] below.

$$UE\_ID = 5G\text{-}S\text{-}TMSI \bmod 1024 \quad [\text{Equation 3}]$$

A 5G S-temporary mobile subscription identifier (5G-S-TMSI) may refer to a temporary terminal identifier provided by a core network in order to uniquely identify a terminal in a tracking area (TA). For example, the 5G-S-TMSI may be provided to the electronic device 101 through higher layer signaling. If the electronic device 101 has not yet been registered in a network, the electronic device 101 may assume that UE_ID is 0. The terminal ID for paging may correspond to a parameter determined by an international mobile subscriber identity (IMSI). In the disclosure, the terminal ID for paging is generalized and used as UE_ID. The UE_ID may include both a value that can be configured based on the 5G-S-TMSI and a value that can be derived from an IMSI value.

PDCCH monitoring occasions for paging may be determined by information about configuration of a paging search space (e.g., a search space indicated by a higher layer signaling parameter pagingSearchSpace) and configuration of a first PDCCH monitoring occasion of a paging occasion (e.g., a higher layer signaling parameter firstPDCCH-MonitoringOccasionOfPO) and by the number of PDCCH monitoring occasions per SSB in a paging occasion (e.g., a higher layer signaling parameter nrofPDCCH-MontiroingOccasionPerSSB-InPO). The pagingSearchSpace, the firstPDCCH-MonitoringOccasionOfPO, and the nrofPDCCH-MontiroingOccasionPerSSB-InPO may be specifically defined as shown in Table 1 below.

TABLE 1 pagingSearchSpace
ID of the Search space for paging (see TS.38.213 [13], clause 10.1). If the field is absent, the UE does not receive paging in this BWP (see TS 38.213 [13], clause 10).
firstPDCCH-MonitoringOccasionOfPO
Points out the first PDCCH monitoring occasion for paging of each PO of the PF, see TS 38.304 [20].
nrofPDCCHMonitoringOccasionPerSSB-InPO
The number of PDCCH monitoring occasions corresponding to an SSB for paging, see TS 38:304 [20] clause 7.1.

When the paging search space is configured to be a search space having a search space ID of 0, one paging occasion may exist in the paging frame if the number of paging occasions for one paging frame (Ns)=1, two paging occasions may exist in the paging frame if Ns=2, a first paging occasion (i_s=0) may exist in a first half frame within the paging frame, and a second paging occasion (i_s=1)) may exist in a second half frame in the paging frame. A search space having a search space ID of 0 may correspond to a search space configured from a master information block (MIB).

If the paging search space is configured to be a search space of which the search space ID is not 0, the electronic device 101 may monitor a (i_s+1)th paging occasion. One paging occasion may configured to be a set of "S*X" consecutive PDCCH monitoring occasions, wherein "S" may correspond to the number of actually transmitted SSBs, and corresponding information may be transmitted as a specific parameter (e.g., ssb-PositionsInBurst) value of a system information block (SIB) from a base station (e.g., the gNB 301) to the electronic device 101. In addition, "X" may correspond to the number of PDCCH monitoring occasions per SSB in a paging occasion (e.g., a higher layer signaling parameter nrofPDCCH-MontiroingOccasionPerSSB-InPO), configured in the electronic device 101 from the base station (e.g., the gNB 301), and if there is no corresponding configuration information, the electronic device 101 may assume that X=1. A [x*S+K]-th (here, it may be defined that x=0, 1, 2, . . . , X−1 and K=1, 2, 3, . . . , S) PDCCH monitoring occasion in the paging occasion may correspond to a Kth transmission SSB. PDCCH monitoring occasions, which do not overlap uplink (UL) symbols, starting with a first PDCCH monitoring occasion in the paging frame, may be sequentially numbered from 0. At this time, if the firstPDCCH-MonitoringOccasionOfPO has been configured through higher layer signaling, a start PDCCH monitoring occasion number of the (i_s+1)-th paging occasion may correspond to an (i_s+1)-th value in the firstPDCCH-MonitoringOccasionOfPO parameter. If the firstPDCCH-MonitoringOccasionOfPO is not configured through higher layer signaling, a start PDCCH monitoring occasion number of the (i_s+1)th paging occasion may be identical to i_s*S*X. If X>1, when the electronic device 101 detects a PDCCH corresponding to a P-RNTI on a paging occasion, the electronic device 101 does not need to perform monitoring for the remaining or subsequent PDCCH monitoring occasions on the corresponding paging occasion. One paging occasion associated with a certain paging frame may be started within the corresponding paging frame or after the corresponding paging frame. PDCCH monitoring occasions for a predetermined paging occasion may exist over a plurality of radio frames. When a search space for paging is configured to be a search space of which the search space ID has a value other than 0, PDCCH monitoring opportunities for one paging occasion may exist over a plurality of periods of the paging search space.

Figure 5A:
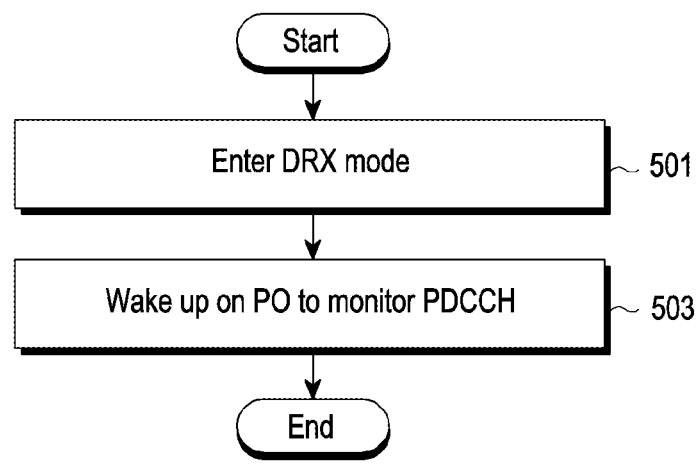
FIG. 5A is a flowchart illustrating an example method of operating an electronic device according to an embodiment.
Figure 5B:
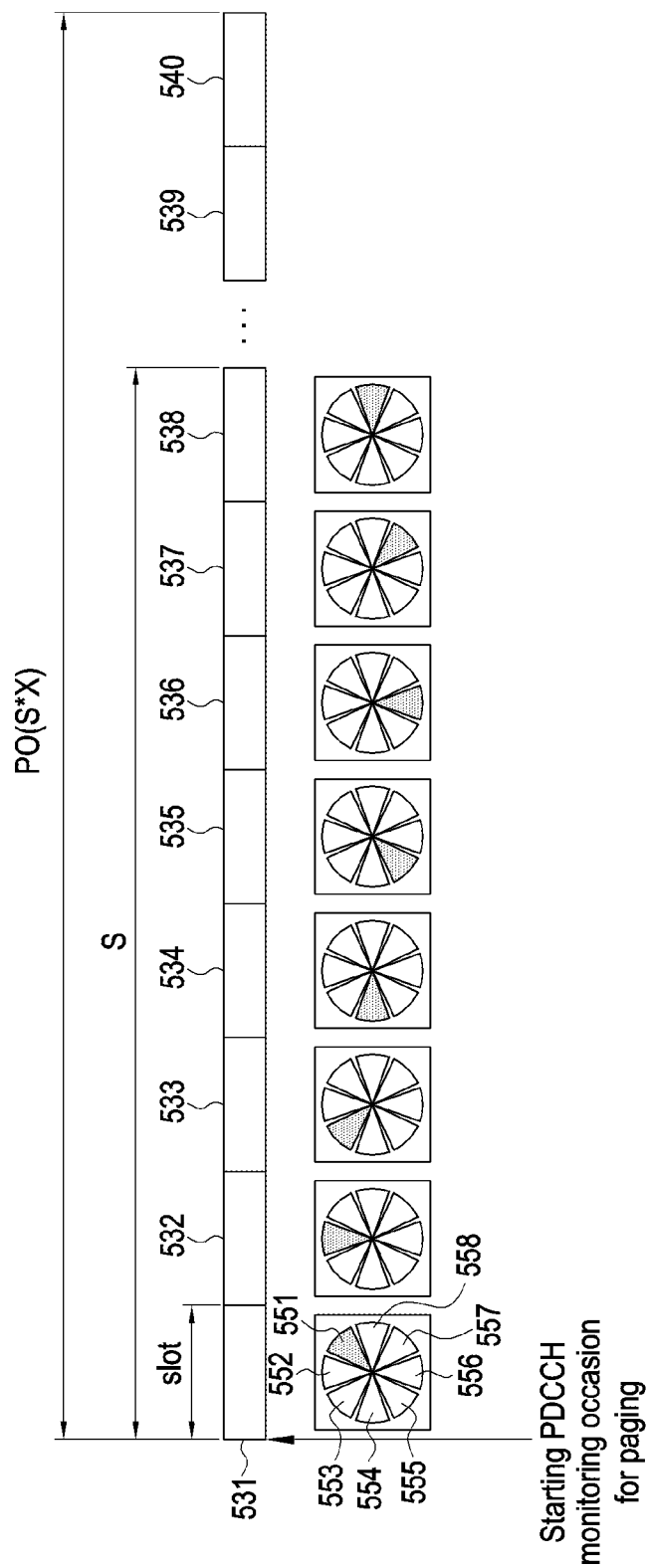
FIG. 5B is a diagram illustrating a correspondence relationship between a time slot and an SSB according to an embodiment.

FIG. 5A is a flowchart illustrating an example method of operating an electronic device according to an embodiment. The embodiment in FIG. 5A will be described with reference to FIG. 5B. FIG. 5B is a diagram illustrating a correspondence relationship between a time slot and an SSB according to an embodiment.

According to an embodiment, in operation 501, the electronic device 101 (e.g., at least one among the processor 120, the first communication processor 212, the second communication processor 214, the integrated communication processor 260, or the integrated SoC) may enter a DRX mode. In the DRX mode, as described above, the electronic device 101 may wake up for predetermined duration to monitor a PDCCH, and may enter the sleep state again when it is determined, based on the result of the monitoring of the PDCCH, that a paging message has not been received. The electronic device 101 may be in a sleep state in the DRX mode, and in operation 503, may wake up on a paging occasion (PO) to monitor a PDCCH.

In an embodiment, the electronic device 101 may receive a configured DRX cycle for paging from a base station (e.g., the gNB 301). As described above, the electronic device 101 may identify, based on Equations 1 and 2, a paging frame, a paging occasion, and at least one PDCCH monitoring occasion in the paging occasion. For example, there may be S*X PDCCH monitoring occasions, and the PDCCH monitoring occasions may correspond to S SSBs, respectively. The PDCCH monitoring occasions may be referred to as time slots. For example, as illustrated in FIG. 5B, one paging occasion (PO) may include S*X PDCCH monitoring occasions 531, 532, 533, 534, 535, 536, 537, 538, 539, 540 (which may be referred to as monitoring occasions 531 to 540). S may be the number of SSBs. The SSB may correspond to respective beam indexes 551, 552, 553, 554, 555, 556, 557, 558 (which may be referred to as beam indexes 551 to 558), and although FIG. 5B illustrates that S is 8, this is merely a non-limiting example. For example, as the first PDCCH monitoring occasion 531 corresponds to the first beam index 551 corresponding to a first SSB, the PDCCH monitoring occasions 531, 532, 533, 534, 535, 536, 537, 538 (which may be referred to as monitoring occasions 531 to 538) may correspond to the first beam index 551 to the eighth beam index 558, respectively. Since the SSBs correspond to the beam indexes, those skilled in the art will understand that the PDCCH monitoring occasions may be expressed as corresponding to the SSBs.

For example, in the first PDCCH monitoring occasion 531 corresponding to the first beam index 551, the base station (e.g., the gNB 301) may transmit DCI to the first beam index 551, and/or may transmit a paging message to the first beam index 551 in a PDSCH configured as the first PDCCH monitoring occasion 531. The base station (e.g., the gNB 301) may repeatedly transmit an identical paging message in a plurality of beam indexes 551 to 558. Accordingly, the electronic device 101 may identify at least one of paging messages that are transmitted based on the plurality of beam indexes 551 to 558, respectively. The electronic device 101 may select any one of the paging messages based on the plurality of beam indexes 551 to 558, may select all of the paging messages, or may select some of the paging messages, and this will be described later. When the electronic device 101 selects at least one paging message instead of all paging messages, the electronic device 101 may wake up only at a PDCCH monitoring occasion corresponding to a corresponding beam index, and thus the wakeup duration may be reduced.

Figure 6A:
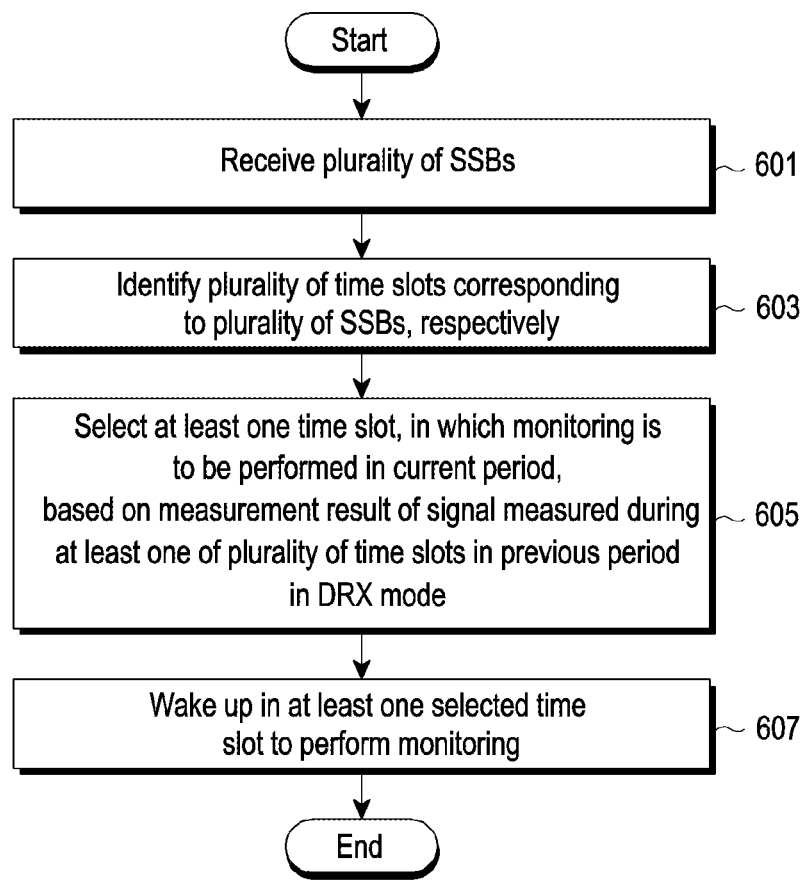
FIG. 6A is a flowchart illustrating an example method of operating an electronic device according to an embodiment.
Figure 6B:
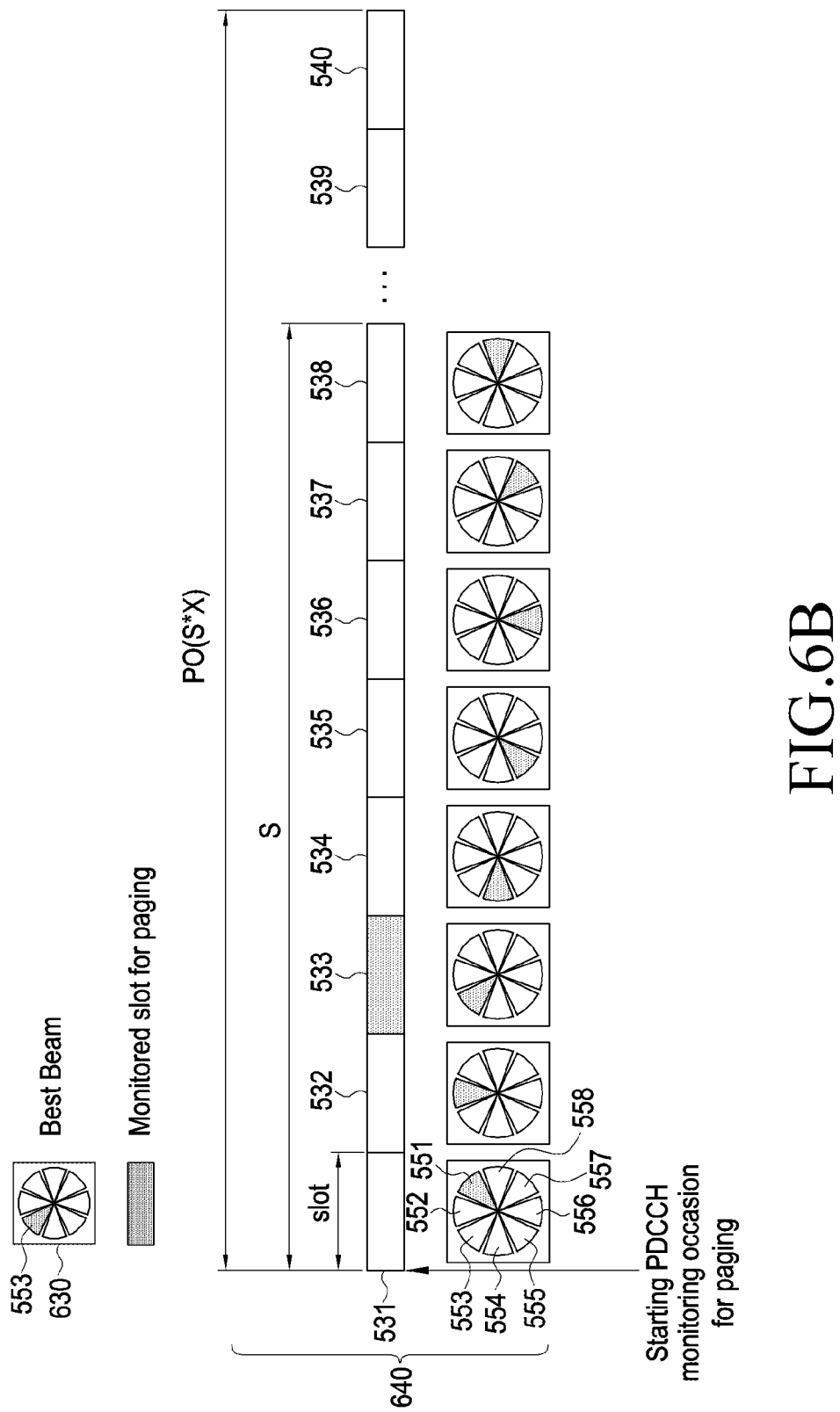
FIG. 6B is a diagram illustrating a correspondence relationship between a time slot and an SSB according to an embodiment.

FIG. 6A is a flowchart illustrating a example method of operating an electronic device according to an embodiment. The embodiment in FIG. 6A will be described with reference to FIG. 6B. FIG. 6B is a diagram illustrating a correspondence relationship between a time slot and an SSB according to an embodiment.

According to an embodiment, in operation 601, the electronic device 101 (e.g., at least one of the processor 120, the first communication processor 212, the second communication processor 214, the integrated communication processor 260, or the integrated SoC) may receive a plurality of SSBs. As described above, the gNB 301 may sequentially transmit a plurality of SSBs based on each of a plurality of beam indexes, and the electronic device 101 may sequentially receive each of the SSBs transmitted by the gNB 301. In operation 603, the electronic device 101 may identify a plurality of time slots corresponding to the plurality of SSBs, respectively. For example, the electronic device 101 may identify, based on information contained in the received SSBs and/or received system information, a paging occasion (PO) and a plurality of PDCCH monitoring occasions 531, 532, 533, 534, 535, 536, 537, and 538 in the paging occasion (PO) as in FIGS. 5B and 6B. The plurality of PDCCH monitoring occasions 531, 532, 533, 534, 535, 536, 537, and 538 may correspond to the plurality of SSBs, respectively.

According to an embodiment, in operation 605, in a DRX mode, the electronic device 101 may select at least one time slot, in which monitoring is to be performed in a current period, based on the measurement result of a signal measured during at least one of a plurality of time slots in the previous period. In one example, the electronic device 101 may identify the result of measurement performed during a time slot corresponding to a beam index of a best beam in the previous period.

For example, referring to FIG. 6B, the electronic device 101 may identify the strength of a signal corresponding to a best beam index 553 in a previous period 630. For example, the electronic device 101 may identify the strength of an SSB during a time slot corresponding to the best beam index 553 (or during a time interval corresponding to the time slot). It will be understood by those skilled in the art that the SSB is merely a non-limiting example, and is not limited as long as the SSB is a signal from a base station that can be measured during a time slot (or a time interval corresponding to the time slot) corresponding to the best beam index 553. It will be understood by those skilled in the art that the electronic device 101 may measure the strength of a signal without limitation as long as the signal is a signal having a QCL relationship with the SSB. The electronic device 101 may measure, as the strength of a signal, at least one of the reference signal received power (RSRP), reference signal received quality (RSRQ), signal-to-interference-noise ratio (SINR), or received signal strength indicator (RSSI) of the signal, but any parameter that can represent the strength of a signal is possible without limitation.

In FIG. 6B, when the strength of the signal corresponding to the beam index 553 in the previous period 630 satisfies a designated condition, the electronic device 101 may select the time slot 533 corresponding to the corresponding beam index 553 as a time slot to be monitored in a current period 640. For example, when the strength of a signal corresponding to the beam index 553 in the previous period 630 exceeds a threshold, the electronic device 101 may select the time slot 533 corresponding to the corresponding beam index 553 as a time slot to be monitored in the current period 640. When the strength of a signal corresponding to the beam index 553 in the previous period 630 is less than or equal to the threshold, the electronic device 101 may select all time slots 531 to 538 corresponding to one SSB burst set as time slot to be monitored in the current period 640.

According to an embodiment, in operation 607, the electronic device 101 may wake up in the at least one selected time slot to monitor a PDCCH. When, in FIG. 6B, the time slot 533 is selected as a time slot to be monitored in the current period 640, the electronic device 101 may wake up in the time slot 533 to perform the monitoring. When all time slots 531 to 538 corresponding to one SSB burst set are selected as time slots to be monitored in this period 640, the electronic device 101 may wake up during the time slots 531 to 538 to perform monitoring.

In FIG. 6A, it has been described that the electronic device 101 selects a time slot to be monitored in a current period, based on a signal measurement result in a specific time slot (e.g., a time slot corresponding to a best beam index) in a previous period. However, it will be understood by those skilled in the art that the electronic device 101 may select, without limitation, any time interval in which a signal corresponding to the best beam index can be measured, as well as the time slot corresponding to the best beam index. For example, when a signal has a QCL relationship with a signal of a best beam index, the electronic device 101 may use the result of measurement of the signal without limitation even when the signal is a signal other than an SSB. For example, when a reference signal corresponding to a best beam index was measured in a previous period (or in the past), the electronic device 101 may select, based on the measurement result, a time slot to be monitored in a current period. In an embodiment, those skilled in the art will understand that determining, by the electronic device 101, whether the strength of a signal measured in a time slot of a previous period satisfies a designated condition may be replaced by determining whether the strength of a predetermined signal associated with a specific beam index satisfies the designated condition at a predetermined past time point.

Figure 6C:
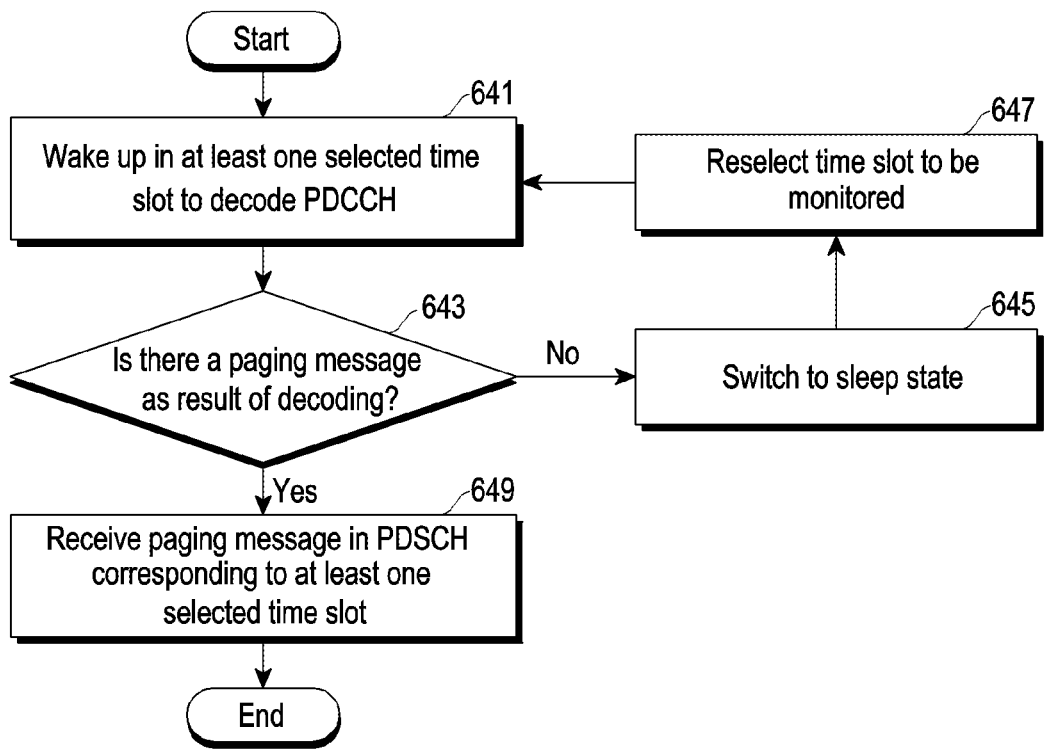
FIG. 6C is a flowchart illustrating an example method of operating an electronic device according to an embodiment.

FIG. 6C is a flowchart illustrating an example method of operating an electronic device according to an embodiment.

According to an embodiment, in operation 641, the electronic device 101 (e.g., at least one of the processor 120, the first communication processor 212, the second communication processor 214, the integrated communication processor 260, or the integrated SoC) may wake up in at least one selected time slot to decode a PDCCH. In operation 643, the electronic device 101 may determine, based on the decoding result, whether there is a paging message from the gNB 301. In the at least one selected time slot, the electronic device 101 may determine whether there is DCI for paging, based on a P-RNTI. When DCI in which a paging message is scheduled is identified in a PDSCH, the electronic device 101 may determine that there is the paging message.

According to an embodiment, when it is determined that there is no paging message from the gNB 301 (643—NO), the electronic device 101 may switch to a sleep state again in operation 645. In operation 647, the electronic device 101 may reselect a time slot to be monitored. The electronic device 101 may reselect a time slot to be monitored, for example, based on a result measured while waking up by operation 641 (or while waking up by another operation). Accordingly, whenever a DRX cycle elapses, a time slot to be monitored (e.g., a PDCCH monitoring occasion) may be selected, and a wakeup duration may be selected for each DRX cycle. When it is determined that there is a paging message (643—YES), the electronic device 101 may receive the paging message in a PDSCH corresponding to the at least one selected time slot in operation 649.

Figure 7A:
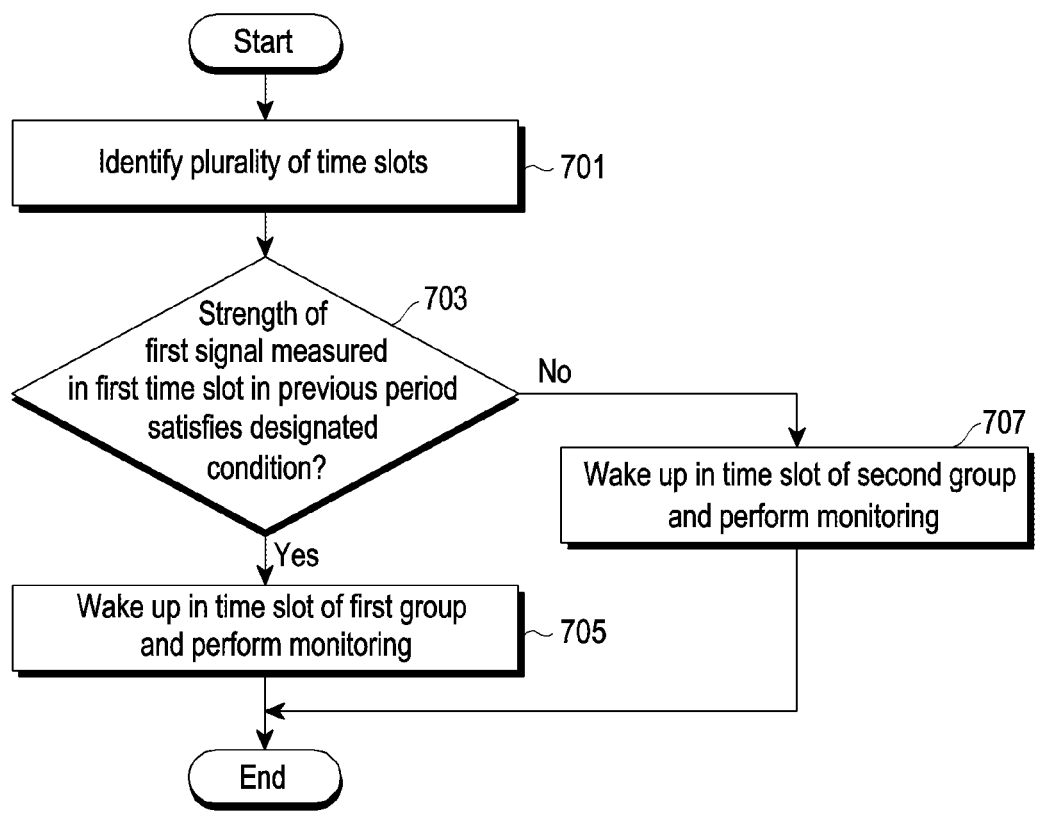
FIG. 7A is a flowchart illustrating an example method of operating an electronic device according to an embodiment.
Figure 7B:
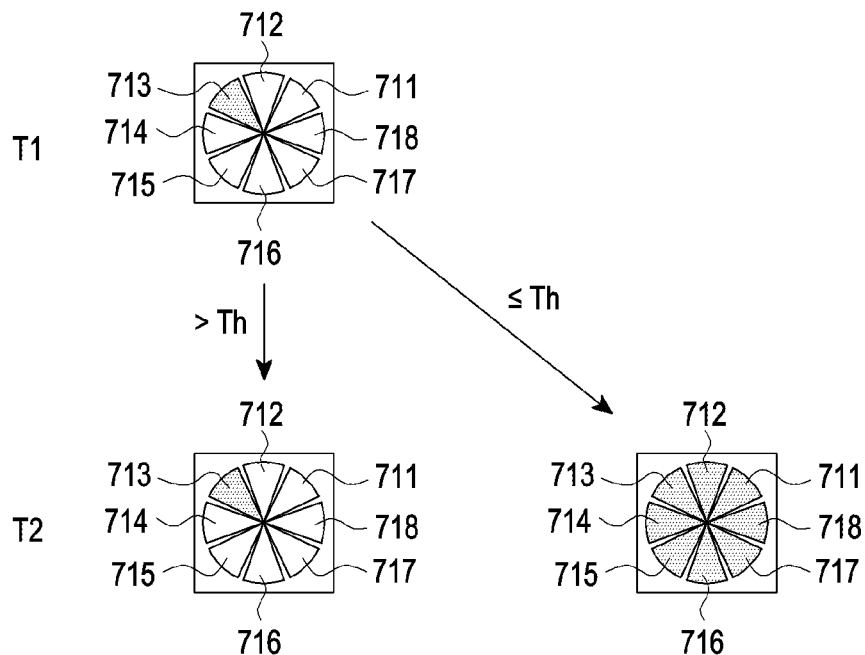
FIGS. 7B and 7C are diagrams illustrating a corresponding relationship between a time slot and an SSB according to an embodiment.
Figure 7C:
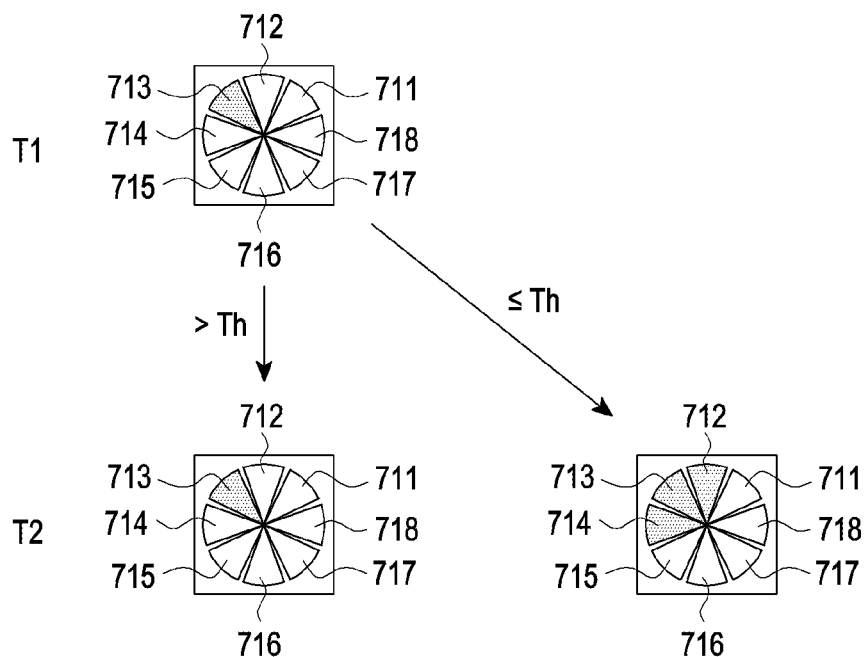

FIG. 7A is a flowchart illustrating an example method of operating an electronic device according to an embodiment. The embodiment in FIG. 7A will be described with reference to FIGS. 7B and 7C. FIGS. 7B and 7C are diagrams illustrating a corresponding relationship between a time slot and an SSB according to an embodiment.

According to an embodiment, in operation 701, the electronic device 101 (e.g., at least one of the processor 120, the first communication processor 212, the second communication processor 214, the integrated communication processor 260, or the integrated SoC) may identify a plurality of time slots. Since an operation in which the electronic device 101 identifies, based on system information, a time slot corresponding to each SSB has been described in detail, the description thereof may not be repeated here. In operation 703, the electronic device 101 may determine whether the strength of a first signal measured in a first time slot in a previous period satisfies a designated condition. For example, the designated condition may be whether the strength of the first signal exceeds a designated threshold, but any condition capable of indicating that the channel state in a corresponding beam index is good may be the designated condition without limitation.

According to an embodiment, when it is determined that the strength of the first signal measured in the first time slot in the previous period satisfies the designated condition (703—Yes), in operation 705, the electronic device 101 may wake up in a time slot of a first group and perform monitoring. When it is determined that the strength of the first signal measured in the first time slot in the previous period does not satisfy the designated condition (703—No), in operation 707, the electronic device 101 may wake up in a time slot of a second group and perform monitoring.

For example, referring to FIG. 7B, the electronic device 101 may measure the strength of a signal (e.g., an SSB) corresponding to a beam index 713 among a plurality of beam indexes 711, 712, 713, 714, 715, 716, 717, 718 (which may be referred to as indexes 711 to 718) at a first time point T1. The electronic device 101 may select, based on whether the signal strength at the first time point T1 satisfies a designated condition, a time slot to be monitored at a current time point T2. When the signal strength at the first time point T1 exceeds a threshold Th, the electronic device 101 may select a time slot corresponding to the beam index 713 of a best beam as a time slot to be monitored. Accordingly, the electronic device 101 may wake up only in the time slot corresponding to the beam index 713 and may be in a sleep state in the remaining time slots, thereby preventing/reducing power consumption and/or resource consumption. When the signal strength at the first time point T1 is less than or equal to the threshold Th, the electronic device 101 may select time slots corresponding to all beam indexes 711 to 718 corresponding to one SSB burst set as time slots to be monitored. Accordingly, when the channel environment deteriorates, the possibility of losing a paging message may be reduced by monitoring a plurality of time slots.

In another example, referring to FIG. 7C, when the strength of the signal at the first time point (T1) exceeds the threshold Th, the electronic device 101 may select a time slot corresponding to the beam index 713 of a best beam as a time slot to be monitored. When the signal strength at the first time point T1 is less than or equal to the threshold Th, the electronic device 101 may select, as time slots to be monitored, time slots corresponding to a plurality of beam indexes 712, 713, and 714 among all beam indexes 711 to 718 corresponding to one SSB burst set. For example, the plurality of beam indexes 712, 713, and 714 may be candidate beam indexes, but there is no limitation.

Figure 8:
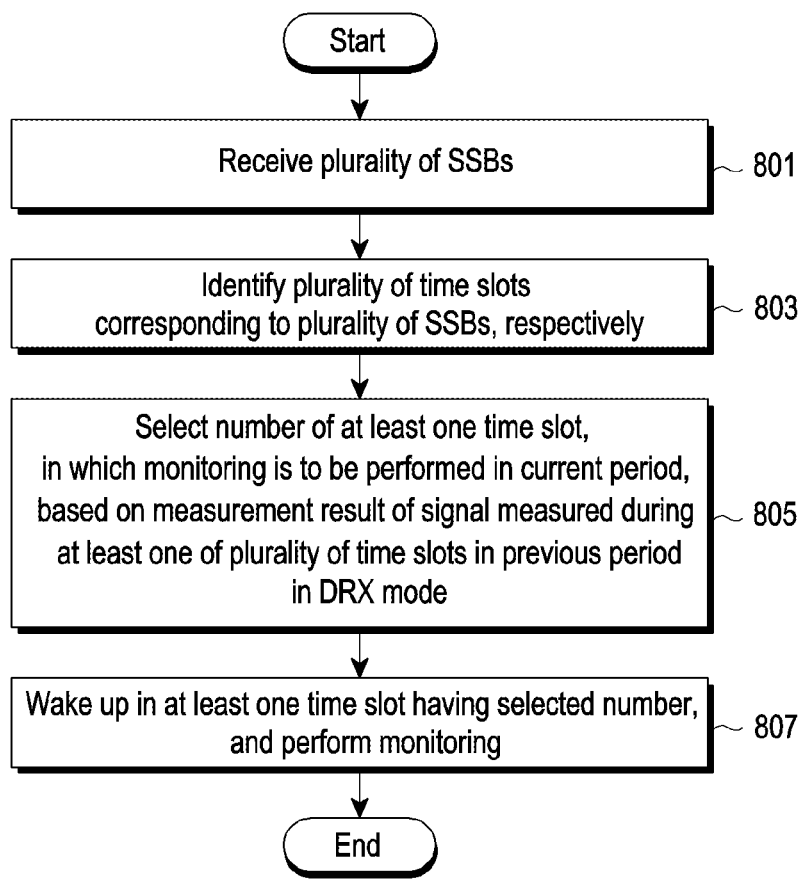
FIG. 8 is a flowchart illustrating an example method of operating an electronic device according to an embodiment.

FIG. 8 is a flowchart illustrating an example method of operating an electronic device according to an embodiment.

According to an embodiment, in operation 801, the electronic device 101 (e.g., at least one of the processor 120, the first communication processor 212, the second communication processor 214, the integrated communication processor 260, or the integrated SoC) may receive a plurality of SSBs. In operation 803, the electronic device 101 may identify a plurality of time slots corresponding to the plurality of SSBs, respectively. As described above, the electronic device 101 may identify, based on received system information, the plurality of time slots corresponding to the plurality of SSBs, respectively.

According to an embodiment, in operation 805, in a DRX mode, the electronic device 101 may select, based on a measurement result of a signal measured during at least one of a plurality of time slots in a previous period, the number of at least one time slot in which monitoring is to be performed in a current period. For example, the electronic device 101 may store the measurement result and related information such as the number of time slots, shown in Table 2.

TABLE 2

| Signal strength | Number of time slots |
|---|---|
| First range | 1 |
| Second range | 3 |
| Third range | 5 |

For example, when it is determined that the strength of a signal measured in a last period falls within a first range, the electronic device 101 may determine, based on the related information shown in Table 1, that the number of time slots is one. In this case, the electronic device 101 may select a time slot corresponding to a beam index of a best beam as a time slot to be monitored. When it is determined that the number of timeslots is three, the electronic device 101 may select three time slots corresponding to a beam index of a best beam and two beam indexes adjacent to the beam index of the best beam. When it is determined that the number of timeslots is five, the electronic device 101 may select five time slots corresponding to a beam index of a best beam and five consecutive beam indexes including the beam index of the best beam. In operation 807, the electronic device 101 may wake up in the at least one time slot, the number of which has been selected, and perform monitoring.

Figure 9:
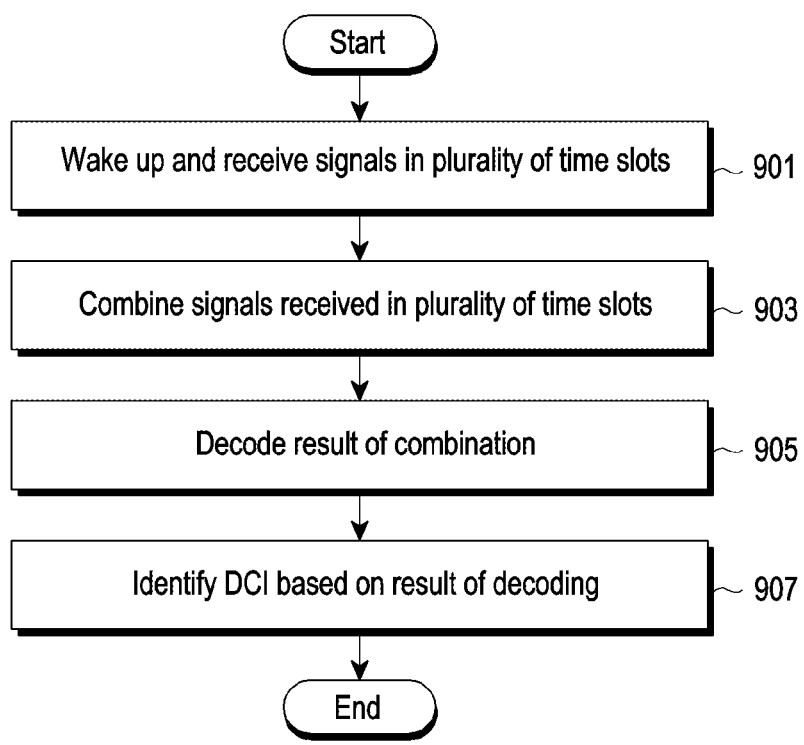
FIG. 9 is a flowchart illustrating an example method of operating an electronic device according to an embodiment.

FIG. 9 is a flowchart illustrating an example method of operating an electronic device according to an embodiment.

In the embodiment of FIG. 9, it is assumed that the electronic device 101 chooses to wake up in a plurality of time slots in a current period, based on a signal measurement result in a previous period. According to an embodiment, in operation 901, in a plurality of selected time slots, the electronic device 101 (e.g., at least one of the processor 120, the first communication processor 212, the second communication processor 214, the integrated communication processor 260, or the integrated SoC) may wake up and receive signals. In operation 903, the electronic device 101 may combine the signals received in the plurality of time slots. For example, the electronic device 101 may combine, based on Chase combining, the signals received in the plurality of time slots. For example, the Chase combining may be a combining method used in a CC HARQ process, and may be applied to the disclosure. The electronic device 101 may store bits received in the plurality of time slots in a buffer, and may combine (e.g., sum) the bits.

According to an embodiment, in operation 905, the electronic device 101 may decode the result of the combining. For example, when the Chase combining is used, the electronic device 101 may use a P-RNTI to decode the result of summing the results stored in the buffer. In operation 907, the electronic device 101 may identify DCI based on the decoding result. When it is determined, based on the DCI, that a resource for a paging message is allocated to a PDSCH, the electronic device 101 may receive a paging message in each of a plurality of PDSCHs that correspond to the plurality of time slots, respectively. The electronic device 101 may receive a paging message in each of a plurality of PDSCHs. The electronic device 101 may combine paging messages in each of the plurality of PDSCHs, and may determine whether the paging messages are for the electronic device 101 based on the combining result.

Figure 10:
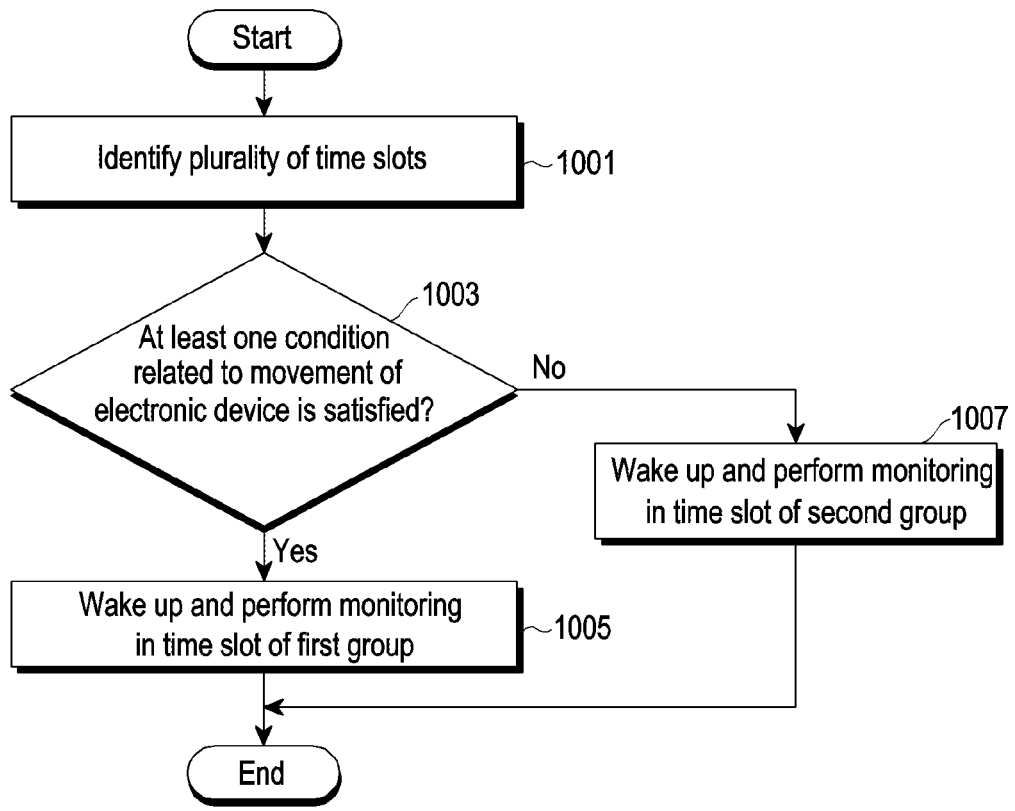
FIG. 10 is a flowchart illustrating an example method of operating an electronic device according to an embodiment.

FIG. 10 is a flowchart illustrating an example method of operating an electronic device according to an embodiment.

According to an embodiment, in operation 1001, the electronic device 101 (e.g., at least one of the processor 120, the first communication processor 212, the second communication processor 214, the integrated communication processor 260, or the integrated SoC) may identify a plurality of time slots. As described above, the electronic device 101 may identify a plurality of time slots that correspond to SSBs of one SSB burst set, respectively.

According to an embodiment, in operation 1003, the electronic device 101 may determine whether at least one condition related to the movement of the electronic device 101 is satisfied. For example, a communication processor (e.g., at least one of the first communication processor 212, the second communication processor 214, or the integrated communication processor 260) of the electronic device 101 may determine, based on information sensed by the communication processor, information about the movement of the electronic device 101. The communication processor may determine the information about the movement of the electronic device 101, based on stability of the measured signal strength. Whether the electronic device 101 has moved may be determined based on the stability of the signal strength.

Figure 11:
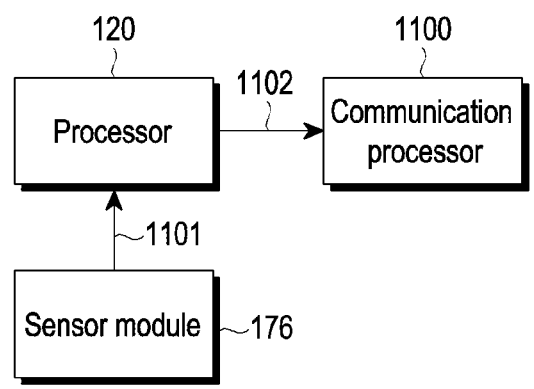
FIG. 11 is a block diagram illustrating an example configuration of an electronic device according to an embodiment.

Alternatively, as in FIG. 11, a communication processor 1100 (e.g., at least one of the first communication processor 212, the second communication processor 214, or the integrated communication processor 260) may receive information 1102 about the movement of the electronic device 101 from a processor 120 (e.g., an application processor). The processor 120 may receive sensing data 1101 for movement measurement from at least one sensor (e.g., at least one of a linear accelerometer, a gyro sensor, or a geomagnetic sensor) of a sensor module (e.g., including at least one sensor) 176. The processor 120 may determine, based on the sensing data 1101, the information on the movement of the electronic device 101. The processor 120 may transmit the information 1102 about the movement to the communication processor (e.g., including communication circuitry) 1100. The information 1102 of the movement may be information about the actual movement of the electronic device 101, but in another example, may be implemented in the form of a flag indicating whether there is a movement.

According to an embodiment, the electronic device (e.g., the communication processor) may determine, based on information on the movement, whether at least one condition related to the movement is satisfied. The at least one condition related to movement may be determined to enable determining a state in which the electronic device 101 may be determined not to move in consideration of tolerance. When it is determined that the at least one condition is satisfied (1003—Yes), in operation 1005, the electronic device 101 may wake up in a time slot of a first group and perform monitoring. When it is determined that the at least one condition is not satisfied (1003—No), in operation 1007, the electronic device 101 may wake up in a time slot of a second group and perform monitoring. As described above, for example, the time slot of the first group may be a time slot corresponding to a beam index of a best beam, but there is no limitation. The time slot of the second group may be time slots corresponding to all of beam-indexes of SSBs of one SSB burst set, or may be time slots corresponding to beam-indexes of a plurality of candidate beams.

Although not illustrated, in an embodiment, the electronic device 101 may determine the degree of movement of the electronic device 101. The electronic device 101 may store, for example, related information about the degree of movement and the number of time slots, similar to those in Table 1. The electronic device 101 may identify, for example, based on the related information, the number of time slots corresponding to the measured degree of movement. The electronic device 101 may wake up and perform monitoring in time slots corresponding to an identified number of beam indexes including a beam of a best beam.

In an embodiment, the electronic device 101 may select a time slot, in which monitoring is to be performed, using both a condition of whether the measured signal strength exceeds a threshold and a condition of movement.

Figure 12:
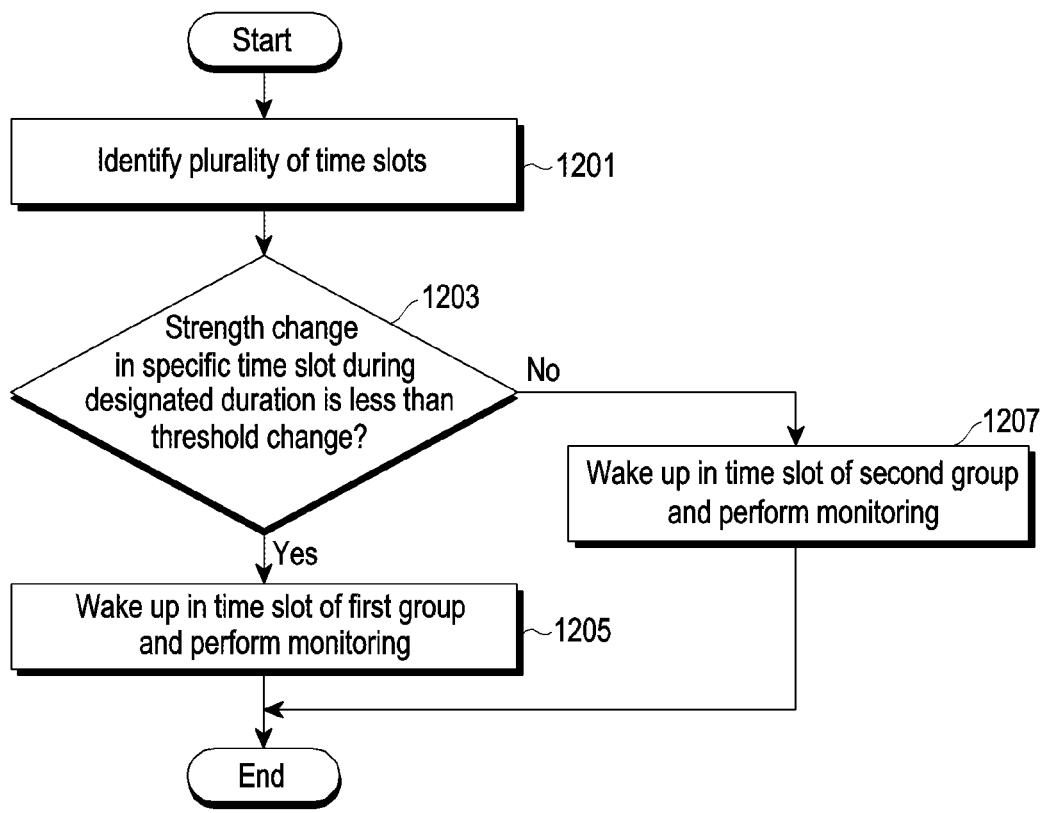
FIG. 12 is a flowchart illustrating an example method of operating an electronic device according to an embodiment.

FIG. 12 is a flowchart illustrating an example method of operating an electronic device according to an embodiment.

According to an embodiment, in operation 1201, the electronic device 101 (e.g., at least one of the processor 120, the first communication processor 212, the second communication processor 214, the integrated communication processor 260, or the integrated SoC) may identify a plurality of time slots. As described above, the electronic device 101 may identify a plurality of time slots that correspond to SSBs of one SSB burst set, respectively.

According to an embodiment, in operation 1203, the electronic device 101 may determine whether a strength change in a specific time slot during designated duration of the electronic device 101 is less than a threshold change. When the electronic device 101 does not move, it may be efficient for the electronic device 101 to perform monitoring in some time slots (e.g., time slots corresponding to optimal SSBs) rather than monitoring time slots corresponding to all SSBs of the SSB burst set. On the other hand, when the electronic device 101 moves, the electronic device 101 may monitor time slots corresponding to all SSBs of an SSB burst set rather than monitor only a time slot corresponding to an existing optimal SSB, thereby enabling accurate decoding. This is because, when the electronic device 101 is moved, a reception condition for the existing optimal SSB may be likely to worsen. Accordingly, when it is determined that the electronic device 101 has moved, the electronic device 101 may monitor all time slots, and may newly identify a best beam index again later. When it is determined that the electronic device 101 enters a stable state again later, the electronic device 101 may monitor a newly identified time slot.

In the embodiment of FIG. 11, it has been described that the communication processor 1100 of the electronic device 101 receives the information 1102 about the movement from the processor 120 (e.g., the application processor), but the communication processor 1100 may determine whether the electronic device 101 moves, without information from the outside. When the electronic device 101 does not move, there is a high possibility that the reception strength of a signal of a specific beam index is not changed. When the electronic device 101 moves, there is a high possibility that the reception strength of a signal of the specific beam index is changed. Whether the electronic device 101 has moved may be determined based on whether the reception strength of a signal of the specific beam index is stable. Accordingly, in operation 1203, the electronic device 101 may determine whether a strength change in a specific time slot during designated duration is less than a threshold change, and whether the electronic device 101 has moved may be determined based on the result of the determination. When the electronic device 101 does not move in consideration of tolerance, it will be determined that the strength change in the specific time slot during the designated duration, which is the condition in operation 1203, is less than the threshold change. When it is determined that the strength change in the specific time slot during the designated duration is less than the threshold change (1203—Yes), in operation 1205, the electronic device 101 may wake up in a time slot of a first group to perform monitoring. The first group may be, for example, time slots corresponding to some SSBs (e.g., optimal SSBs) of an SSB burst set. When the electronic device 101 moves in consideration of tolerance, it will be determined that the strength change in the specific time slot during the designated duration, which is the condition in operation 1203, is greater than or equal to the threshold change. When it is determined that the strength change in the specific time slot during the designated duration is greater than or equal to the threshold change (1203—No), in operation 1207, the electronic device 101 may wake up in a time slot of a second group and perform monitoring. As described above, the time slot of the second group may be time slots, the number of which enables stable decoding of a signal, and in one example, may be a time slot corresponding to all SSBs in one SSB burst set or a time slot corresponding to a candidate beam index.

The electronic device 101 according to an embodiment may select a time slot to be monitored, using both whether the strength of a received signal satisfies a designated condition, as in FIG. 7A, and whether at least one condition related to the movement of the electronic device 101 is satisfied, as in FIG. 10.

Figure 13:
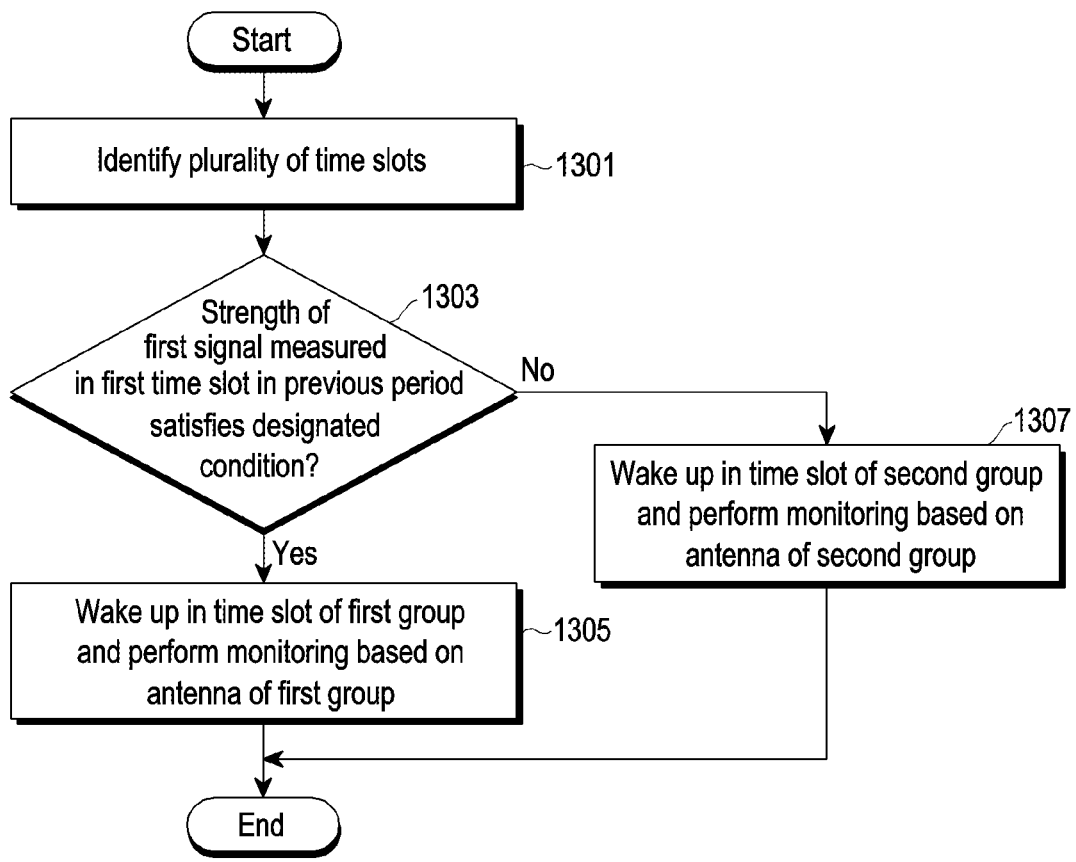
FIG. 13 is a flowchart illustrating an example method of operating an electronic device according to an embodiment.

FIG. 13 is a flowchart illustrating an example method of operating an electronic device according to an embodiment.

According to an embodiment, in operation 1301, the electronic device 101 (e.g., at least one of the processor 120, the first communication processor 212, the second communication processor 214, the integrated communication processor 260, or the integrated SoC) may identify a plurality of time slots. In operation 1303, the electronic device 101 may determine whether the strength of a first signal measured in a first time slot in a previous period satisfies a designated condition. For example, the electronic device 101 may determine whether the strength of the first signal exceeds a designated threshold as whether the designated condition is satisfied, but the condition is not limited.

According to an embodiment, when it is determined that the strength of the first signal satisfies the designated condition (1303—Yes), in operation 1305, the electronic device 101 may wake up in a time slot of a first group and perform monitoring based on an antenna of a first group. For example, an antenna of the first group may be a group including at least one antenna among antennas included in the second antenna module 244 and the third antenna module 246. When it is determined that the strength of the first signal does not satisfy the designated condition (1303—No), in operation 1307, the electronic device 101 may wake up in a time slot of a second group different from the first group and perform monitoring based on an antenna of the second group. For example, an antenna of the second group may be a group including at least one antenna among antennas included in the second antenna module 244 and the third antenna module 246, and may be more than the antennas of the first group. When compared with the use of an antenna of the first group, the use of an antenna of the second group may increase antenna diversity and increase the possibility of successful decoding. Accordingly, when it is determined that a channel environment is deteriorated, the electronic device 101 may perform monitoring using more antennas as well as performing monitoring in more time slots, thereby increasing the probability of success of decoding.

In an example, while the electronic device 101 performs monitoring based on antennas of the first group, the electronic device 101 may detect that the strength of the first signal does not satisfy the designated condition. In this case, the electronic device 101 may determine whether there are idle antennas. When it is determined that there are idle antennas, the electronic device 101 may be configured to perform monitoring by additionally using at least some of the idle antennas.

Although not illustrated, the electronic device 101 according to an embodiment may select an antenna group based on whether the electronic device 101 has moved, instead of whether the signal strength satisfies the designated condition in operation 1303. When it is determined that the electronic device 101 has not substantially moved, the electronic device 101 may wake up, as in operation 1305, in a time slot of the first group and perform monitoring based on an antenna of the first group. When it is determined that the electronic device 101 has substantially moved, the electronic device 101 may wake up, as in operation 1307, in a time slot of the second group and perform monitoring based on an antenna of the second group.

According to an example embodiment, an electronic device may include: a memory; at least one communication circuit; and at least one processor, wherein the at least one processor is configured to: receive, via the at least one communication circuit, a plurality of synchronization signal/PBCH blocks (SSBs) from a network, identify a plurality of time slots corresponding to the plurality of SSBs, respectively, select, based on a measurement result of a signal measured in at least one of the plurality of time slots in a previous period in a discontinuous reception (DRX) mode, at least one time slot in which monitoring is to be performed in a current period, and wake up in the selected at least one time slot and monitor a physical downlink control channel (PDCCH).

According to an example embodiment, the at least one processor may be configured to: select, based on whether the strength of a signal corresponding to a best beam index satisfies a designated condition, the at least one time slot, in which monitoring is to be performed in the current period, from among the plurality of time slots in the previous period as at least a part of the selecting of the at least one time slot in which monitoring is to be performed in the current period.

According to an example embodiment, the at least one processor may be configured, as at least a part of the selecting of the at least one time slot in which monitoring is to be performed in the current period, to: select a time slot of a first group based on the strength of the signal corresponding to the best beam index being determined to exceed a threshold, and select a time slot of a second group different from the first group based on the strength of the signal corresponding to the best beam index being determined to be equal to or less than the threshold.

According to an example embodiment, the at least one processor may be configured to: select a time slot corresponding to the best beam index as the time slot of the first group as at least a part of the selecting of the time slot of the first group based on the strength of the signal corresponding to the best beam index being determined to exceed the threshold.

According to an example embodiment, the at least one processor may be further configured to: detect downlink control information (DCI) indicating whether there is a paging message in the time slot corresponding to the best beam index, and receive, via the at least one communication circuit based on the detection of the DCI, the paging message in a physical downlink shared channel (PDSCH) reserved based on the DCI.

According to an example embodiment, the at least one processor may be configured to: select a plurality of time slots corresponding to time slots corresponding to all SSBs included in one SSB burst set as the time slot of the second group, as at least a part of the selecting of the time slot of the second group based on the strength of the signal corresponding to the best beam index being determined to be equal to or less than the threshold.

According to an example embodiment, the at least one processor may be further configured to: detect pieces of downlink control information (DCI) indicating whether there is a paging message in each of the plurality of time slots, and receive, via the at least one communication circuit based on the detection of the pieces of DCI, the paging message in each of physical downlink shared channels (PDSCHs) reserved based on the DCI.

According to an example embodiment, the at least one processor may, as at least a part of the detecting of the pieces of DCI indicating whether there is the paging message in each of the plurality of time slots, be configured to: combine signals received in each of the plurality of time slots and detect the pieces of DCI based on the result of decoding the result of the combination based on a paging-radio network temporary identifier (P-RNTI) allocated to the electronic device.

According to an example embodiment, the at least one processor may, as at least a part of waking up in the selected at least one time slot and monitoring a PDCCH, be configured to: wake up in the time slot of the first group, based on the strength of the signal corresponding to the best beam index being determined to exceed the threshold, and perform monitoring based on an antenna of a first group of the electronic device, and wake up in the time slot of the second group, based on the strength of the signal corresponding to the best beam index being determined to be equal to or less than the threshold, and perform monitoring based on an antenna of a second group different from the first group.

According to an example embodiment, the at least one processor may, as at least a part of the selecting of at least one time slot, in which monitoring is to be performed in the current period, based on the measurement result of the signal measured in at least one of the plurality of time slots in the previous period, be configured to: measure the reception strength of an SSB corresponding to a best beam index, and select, based on the reception strength, at least one time slot in which monitoring is to be performed in the current period.

According to an example embodiment, the at least one processor may be further configured to wake up in the selected at least one PDCCH monitoring occasion, monitor a PDCCH, and enter a sleep state when there is no paging message as a result of the monitoring.

According to an example embodiment, the at least one processor may be further configured to: reselect, based on a measurement result of another signal measured during the wake-up, a time slot, in which monitoring in a next period is to be performed, after entering the sleep state.

According to an example embodiment, an electronic device may include: a memory; at least one communication circuit; and at least one processor, wherein the at least one processor is configured to: receive, via the at least one communication circuit, a plurality of synchronization signal (SS)/physical broadcast channel (PBCH) blocks (SSBs) from a network, identify a plurality of time slots corresponding to the plurality of SSBs, respectively, select at least one time slot, in which monitoring is to be performed in a current period, based on information associated with movement of the electronic device in a discontinuous reception (DRX) mode, and wake up in the selected at least one physical downlink control channel (PDCCH) monitoring occasion and monitor a PDCCH.

According to an example embodiment, the at least one processor may be configured to: select, based on whether a change in strength of a signal corresponding to a best beam index is less than a threshold change during designated duration, the at least one time slot, in which monitoring is to be performed in the current period, from among the plurality of time slots in the previous period as at least a part of the selecting of the at least one time slot in which monitoring is to be performed in the current period.

According to an example embodiment, the at least one processor may, as at least a part of the selecting of the at least one time slot in which monitoring is to be performed in the current period, be configured to: select a time slot of a first group based on the change in the strength of the signal corresponding to the best beam index being determined to be less than the threshold change, and select a time slot of a second group different from the first group based on the change in the strength of the signal corresponding to the best beam index being determined to be equal to or greater than the threshold change.

According to an example embodiment, the electronic device may further include at least one sensor configured to sense data associated with the movement of the electronic device, wherein the at least one processor is configured to: select at least one time slot in which monitoring is to be performed in a current period, based on information associated with the movement of the electronic device identified based on sensing data identified by the at least one sensor.

According to an example embodiment, a method of operating an electronic device may include: receiving a plurality of synchronization signal/PBCH blocks (SSBs) from a network, identifying a plurality of time slots corresponding to the plurality of SSBs, respectively, selecting, based on a measurement result of a signal measured in at least one of the plurality of time slots in a previous period in a discontinuous reception (DRX) mode, at least one time slot in which monitoring is to be performed in a current period, and waking up in the selected at least one time slot and monitoring a physical downlink control channel (PDCCH).

According to an example embodiment, in the selecting of the at least one time slot in which monitoring is to be performed in the current period, the at least one time slot, in which monitoring is to be performed in the current period, may be selected, based on whether the strength of a signal corresponding to a best beam index satisfies a designated condition, from among the plurality of time slots in the previous period.

According to an example embodiment, the selecting of the at least one time slot in which monitoring is to be performed in the current period may include: selecting a time slot of a first group based on the strength of the signal corresponding to the best beam index being determined to exceed a threshold, and selecting a time slot of a second group different from the first group based on the strength of the signal corresponding to the best beam index being determined to be equal to or less than the threshold.

According to an example embodiment, in the selecting of the time slot of the first group based on the strength of the signal corresponding to the best beam index being determined to exceed the threshold, a time slot corresponding to the best beam index may be selected as the time slot of the first group.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to an embodiment and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to an example embodiment, it will be understood that an example embodiment is intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising
a memory storing instructions;
at least one communication circuitry; and
at least one processor,
wherein the instructions, when executed by the at least one processor individually or collectively cause the electronic device to:
receive, via the communication circuitry, a plurality of synchronization signal (SS)/physical broadcast channel (PBCH) blocks (SSBs) from a network,
identify a plurality of time slots which correspond to the plurality of SSBs, respectively,
select, based on a measurement result of a signal measured in at least one of the plurality of time slots in a previous period, a time slot of a first group based on a determination that a strength of a signal corresponding to a best beam index exceeds a threshold,
select a time slot of a second group different from the first group based on a determination that the strength of the signal corresponding to the best beam index is equal to or less than the threshold, and
wake up in the selected time slot of the first group or the selected time slot of the second group and monitor a physical downlink control channel (PDCCH).

2. The electronic device of claim 1, wherein the time slot of the first group is a time slot corresponding to a beam index of a best beam and the time slot of the second group are time slots corresponding to all of time-indexes of the SSBs of one SSB burst set.

3. The electronic device of claim 1, wherein the instructions, when executed by the at least one processor individually or collectively, cause the electronic device to:
select a number of time slots depending on a measured degree of movement of the electronic device.

4. The electronic device of claim 1, wherein the instructions, when executed by the at least one processor individually or collectively, cause the electronic device to:
select part of the time slot of the first group when the strength of the signal corresponding to the best beam index is determined to exceed the threshold.

5. The electronic device of claim 4, wherein the instructions, when executed by the at least one processor individually or collectively, cause the electronic device to:
detect downlink control information (DCI) indicating whether there is a paging message in the time slot corresponding to the best beam index, and
receive, via the communication circuitry based on the detection of the DCI, the paging message in a reserved physical downlink shared channel (PDSCH) based on the DCI.

6. The electronic device of claim 1, wherein the instructions, when executed by the at least one processor individually or collectively, cause the electronic device to:
select a plurality of time slots corresponding to time slots corresponding to all SSBs included in one SSB burst set as the time slot of the second group as at least part of the selecting of the time slot of the second group when the strength of the signal corresponding to the best beam index is determined to be equal to or less than the threshold.

7. The electronic device of claim 6, wherein the instructions, when executed by the at least one processor individually or collectively, cause the electronic device to:
detect pieces of downlink control information (DCI) indicating whether there is a paging message in each of the plurality of time slots, and
receive, via the communication circuitry, based on the detection of the pieces of DCI, the paging message in each of reserved physical downlink shared channels (PDSCHs) based on the DCI.

8. The electronic device of claim 7, wherein the instructions, when executed by the at least one processor individually or collectively, cause the electronic device to:
combine signals received in each of the plurality of time slots, and
detect the pieces of DCI based on a result of decoding a result of the combination based on a paging-radio network temporary identifier (P-RNTI) allocated to the electronic device.

9. The electronic device of claim 1, wherein the instructions, when executed by the at least one processor individually or collectively, cause the electronic device to:
wake up in the time slot of the first group and perform monitoring based on an antenna of a first group of the electronic device when the strength of the signal corresponding to the best beam index is determined to exceed the threshold, and
wake up in the time slot of the second group and perform monitoring based on an antenna of a second group different from the first group when the strength of the signal corresponding to the best beam index is determined to be equal to or less than the threshold.

10. The electronic device of claim 1, wherein the instructions, when executed by the at least one processor individually or collectively, cause the electronic device to:
measure reception strength of an SSB which corresponds to a best beam index, and
select, based on the reception strength, at least one time slot in which monitoring is to be performed in a current period.

11. The electronic device of claim 1, wherein the instructions, when executed by the at least one processor individually or collectively, cause the electronic device to:
wake up in at least one PDCCH monitoring occasion, monitor a PDCCH, and enter a sleep state when there is no paging message as a result of the monitoring.

12. The electronic device of claim 11, wherein the instructions, when executed by the at least one processor individually or collectively, cause the electronic device to:
- reselect, based on a measurement result of another signal measured while waking up a time slot in which monitoring in a next period is to be performed, after entering the sleep state.

13. The electronic device of claim 1, wherein the instructions, when executed by the at least one processor individually or collectively, cause the electronic device to:
- when the strength of the signal corresponding to the best beam index associated with the previous period is determined to be equal to or less than the threshold, receive, during a period next to the previous period, a plurality of paging messages in paging occasions for beams associated with the plurality of SSBs,
- combine the plurality of paging messages, and
- decode the combined plurality of paging messages.

14. A method of operating an electronic device, the method comprising:
- receiving a plurality of synchronization signal (SS)/physical broadcast channel (PBCH) blocks (SSBs) from a network;
- identifying a plurality of time slots which correspond to the plurality of SSBs, respectively;
- selecting, based on a measurement result of a signal measured in at least one of the plurality of time slots in a previous period, a time slot of a first group in response to determining that a strength of a signal corresponding to a best beam index exceeds a threshold;
- selecting a time slot of a second group different from the first group in response to determining that the strength of the signal corresponding to the best beam index is equal to or less than the threshold; and
- waking up in the selected time slot of the first group or the selected time slot of the second group and monitoring a physical downlink control channel (PDCCH).

15. The method of claim 14, wherein the time slot of the first group is a time slot corresponding to a beam index of a best beam and the time slot of the second group are time slots corresponding to all of time-indexes of the SSBs of one SSB burst set.

16. The method of claim 15, further comprising:
- selecting a number of time slots depending on a measured degree of movement of the electronic device.

17. The method of claim 14, wherein the selecting of the time slot of the first group based on the strength of the signal corresponding to the best beam index being determined to exceed the threshold comprises selecting a time slot corresponding to the best beam index as the time slot of the first group.

18. An electronic device comprising
a memory storing instructions;
at least one communication circuitry; and
at least one processor,
wherein the instructions, when executed by the at least one processor individually or collectively cause the electronic device to:
- receive, via the communication circuitry, a plurality of synchronization signal (SS)/physical broadcast channel (PBCH) blocks (SSBs) from a network,
- identify a plurality of time slots which correspond to the plurality of SSBs, respectively,
- select, based on information associated with movement of the electronic device, at least one time slot in which monitoring is to be performed in a current period in a discontinuous reception (DRX) mode, and
- wake up in the selected at least one time slot and monitor a physical downlink control channel (PDCCH).

19. The electronic device of claim 18, wherein the instructions, when executed by the at least one processor individually or collectively, cause the electronic device, as at least a part of the selecting of the at least one time slot in which the monitoring is to be performed in the current period, to:
- select, based on whether a change in strength of a signal corresponding to a best beam index is less than a threshold change during designated duration, the at least one time slot, in which monitoring is to be performed in the current period, from among the plurality of time slots in a previous period as at least a part of the selecting of the at least one time slot in which monitoring is to be performed in the current period.

20. The electronic device of claim 19, wherein the instructions, when executed by the at least one processor individually or collectively, cause the electronic device, as at least a part of the selecting of the at least one time slot in which monitoring is to be performed in the current period, to:
- select a time slot of a first group based on the change in the strength of the signal corresponding to the best beam index being determined to be less than the threshold change, and select a time slot of a second group different from the first group based on the change in the strength of the signal corresponding to the best beam index being determined to be equal to or greater than the threshold change.

21. The electronic device of claim 18, further comprising:
at least one sensor configured to sense data associated with the movement of the electronic device,
wherein the instructions, when executed by the at least one processor individually or collectively, cause the electronic device to:
select the at least one time slot in which the monitoring is to be performed in the current period, based on information associated with the movement of the electronic device identified based on sensing data identified by the at least one sensor.

* * * * *